(12) United States Patent
Kouno et al.

(10) Patent No.: US 9,718,999 B2
(45) Date of Patent: Aug. 1, 2017

(54) PHOTOCURABLE COMPOSITION HAVING ADHESIVE PROPERTIES

(71) Applicant: CEMEDINE CO., LTD., Tokyo (JP)

(72) Inventors: Shouma Kouno, Tokyo (JP); Hiroshi Yamaga, Tokyo (JP); Naomi Okamura, Tokyo (JP); Atsushi Saito, Tokyo (JP)

(73) Assignee: CEMEDINE CO., LTD, Tokyo (JP)

( * ) Notice: Subject to any disclaimer, the term of this patent is extended or adjusted under 35 U.S.C. 154(b) by 0 days.

(21) Appl. No.: 15/103,492

(22) PCT Filed: Dec. 12, 2014

(86) PCT No.: PCT/JP2014/083029
§ 371 (c)(1),
(2) Date: Jun. 10, 2016

(87) PCT Pub. No.: WO2015/088021
PCT Pub. Date: Jun. 18, 2015

(65) Prior Publication Data
US 2016/0312089 A1 Oct. 27, 2016

(30) Foreign Application Priority Data

Dec. 13, 2013 (JP) .................................. 2013-258209
Feb. 5, 2014 (JP) .................................. 2014-019900

(51) Int. Cl.
| | |
|---|---|
| C08F 2/46 | (2006.01) |
| C08G 61/04 | (2006.01) |
| C09J 171/02 | (2006.01) |
| C09J 133/00 | (2006.01) |
| C09J 201/10 | (2006.01) |
| C09J 4/06 | (2006.01) |
| C09J 133/14 | (2006.01) |
| C09J 183/12 | (2006.01) |
| C08L 71/02 | (2006.01) |
| C08G 18/71 | (2006.01) |
| C08F 230/08 | (2006.01) |
| C08G 63/00 | (2006.01) |
| C08G 18/28 | (2006.01) |
| C08G 65/336 | (2006.01) |
| C08L 43/04 | (2006.01) |
| C08L 75/00 | (2006.01) |
| C08L 101/10 | (2006.01) |
| C08G 77/26 | (2006.01) |
| C08G 77/46 | (2006.01) |

(52) U.S. Cl.
CPC .......... *C09J 171/02* (2013.01); *C08F 230/08* (2013.01); *C08G 18/289* (2013.01); *C08G 18/718* (2013.01); *C08G 63/00* (2013.01); *C08G 65/336* (2013.01); *C08L 43/04* (2013.01); *C08L 71/02* (2013.01); *C08L 75/00* (2013.01); *C08L 101/10* (2013.01); *C09J 4/06* (2013.01); *C09J 133/00* (2013.01); *C09J 133/14* (2013.01); *C09J 183/12* (2013.01); *C09J 201/10* (2013.01); *C08G 77/26* (2013.01); *C08G 77/46* (2013.01)

(58) Field of Classification Search
CPC ...... C09J 171/02; C09J 133/00; C09J 201/10; C09J 183/12; C09J 133/14; C09J 4/06; C08G 77/26; C08G 77/46; C08L 71/02
USPC .................................. 522/146, 134, 1; 520/1
See application file for complete search history.

(56) References Cited

U.S. PATENT DOCUMENTS

| | | | |
|---|---|---|---|
| 2015/0259581 A1* | 9/2015 | Miyafuji | ................ C09J 171/02 525/474 |
| 2016/0152783 A1* | 6/2016 | Yamaga | ............... C08G 65/336 522/109 |

FOREIGN PATENT DOCUMENTS

| | | | |
|---|---|---|---|
| JP | 2001-172514 A1 | | 6/2001 |
| JP | 2003-321479 A1 | | 11/2003 |
| JP | 2011-37954 A1 | | 2/2011 |
| JP | 2012-056976 | * | 3/2012 |
| JP | 2012-56976 A1 | | 3/2012 |
| WO | WO 2007/123167 A1 | | 11/2007 |
| WO | 2014-038656 | * | 3/2014 |

OTHER PUBLICATIONS

Tsuruta et al, JP 2012-056976 Machine Translation, Mar. 12, 2012.*
J. Jennane, et al.; "Photolithography of self-assembled monolayers: optimization of protecting groups by an electroanalytical method;" Can. J. Chem.; vol. 74; No. 12; 1996; pp. 2509-2517 (9 Sheets)/Cited in International Search Report.
International Search Report for International Application No. PCT/JP2014/083029 dated Mar. 31, 2015.

* cited by examiner

*Primary Examiner* — Jessica E Whiteley
(74) *Attorney, Agent, or Firm* — Kratz, Quintos & Hanson, LLP

(57) ABSTRACT

The present invention provides a curable composition containing an organic polymer having a crosslinkable silicon group, the composition having sufficient usable life and having adhesive properties with respect to an adherend (substrate) that are equivalent to those of the case where aminosilane is included. The composition comprises: (A) a crosslinkable silicon group-containing organic polymer; and (B) a crosslinkable silicon group-containing compound that forms, by means of light, at least one type of amino group selected from the group consisting of primary amino groups and secondary amino groups. The crosslinkable silicon group-containing organic polymer (A) is preferably at least one type selected from the group consisting of crosslinkable silicon group-containing polyoxyalkylene polymers and crosslinkable silicon group-containing (meth)acrylic-based polymers.

6 Claims, No Drawings

PHOTOCURABLE COMPOSITION HAVING ADHESIVE PROPERTIES

TECHNICAL FIELD

The present invention relates to a photocurable composition having adhesive properties, and particularly relates to a photocurable composition that is curable in a short period of time and that has excellent adhesive properties.

BACKGROUND ART

An organic polymer having a silicon-containing group that has a hydroxy group or hydrolyzable group bonded to a silicon atom and that can be crosslinked by forming a siloxane bond (hereinafter, also referred to as "crosslinkable silicon group") has been known to have properties by which the organic polymer can be formed into a liquid form for easy coating or charging and by which a rubber-like cured product can be obtained by crosslinking caused by formation of a siloxane bond involved with a hydrolysis reaction or the like of the crosslinkable silicon group as a result of actions of moisture in the air or the like even at room temperature. Because of this, this polymer is widely used for applications in sealing materials, adhesive agents, coating materials, and the like. Examples of the polymer having a crosslinkable silicon group include polyoxyalkylene polymers and (meth) acrylate-based polymers.

Adhering process using an adhesive agent is generally performed by, after coating the adhesive agent on a first adherend, bonding a second adherend to the first adherend. At this time, if curing proceeds at the time of coating the adhesive agent to the first adherend, the second adherend cannot be bonded. Such a problem often occurs in a case where an adhesive agent with a high cure rate is used and/or in a case where, even when an adhesive agent with a cure rate that is not high is used, a coated area of the adhesive agent is large or a coated thickness of the adhesive agent is small. Because of this, if curing can proceed at the time of adding some sort of trigger, such as photoirradiation, sufficient time can be allocated for the coating operation (elongating usable life), and thus workability during the adhering process can be enhanced. Long usable life may be required not only for an adhesive agent but also for a coating material or sealing material.

Patent Document 1 discloses a curable composition comprising: an organic polymer having a crosslinkable silicon group, and a compound that generates an acid or base when irradiated with light. The compound that generates an acid or base when irradiated with light does not act as a curing catalyst before the light irradiation but generates the acid or base that serves as the curing catalyst after the light irradiation. Therefore, the composition remains as a liquid since curing does not proceed even when water is present prior to the light irradiation, and the curing can proceed utilizing the light irradiation as a trigger. Accordingly, the curable composition disclosed in Patent Document 1 can be suitably used for adhesive agents or the like required to have a long usable life.

Although the organic polymer having a crosslinkable silicon group is used for sealing materials, adhesive agents, coating materials, and the like as described above, adhesive properties with respect to an adherend (substrate) is necessary in this case. As a method of improving adhesive properties of the organic polymer having a crosslinkable silicon group, use of a silane coupling agent, such as aminosilane, epoxysilane, mercaptosilane, isocyanate silane, or phenylsilane, has been known. However, the aminosilane cannot be used in the curable composition comprising: an organic polymer having a crosslinkable silicon group, and a compound that generates an acid or base when irradiated with light disclosed in Patent Document 1. This is because the curing proceeds before the light irradiation since the aminosilane is a base itself. Therefore, when a silane coupling agent is used to improve the adhesive properties, a neutral silane coupling agent, such as epoxysilane or phenylsilane, has to be used; however, when such a compound is used, sufficient adhesive properties may not be obtained.

CITATION LIST

Patent Literature

Patent Document 1: Japanese Unexamined Patent Application Publication No. 2001-172514A

SUMMARY OF INVENTION

Technical Problem

A problem to be solved by the present invention is to provide a curable composition containing an organic polymer having a crosslinkable silicon group, the composition having sufficient usable life and having adhesive properties with respect to an adherend (substrate) that are equivalent to those of the case where aminosilane is included.

Solution to Problem

To solve the problem described above, the photocurable composition having adhesive properties of the present invention is a composition comprising: (A) a crosslinkable silicon group-containing organic polymer; and (B) a crosslinkable silicon group-containing compound that forms, by means of light, at least one type of amino group selected from the group consisting of primary amino groups and secondary amino groups.

The photocurable composition of the present invention preferably further comprises (C) a silicon compound having a Si—F bond.

The photocurable composition of the present invention preferably further comprises (D) a photobase generator besides the crosslinkable silicon group-containing compound (B).

The crosslinkable silicon group-containing organic polymer (A) is preferably at least one type selected from the group consisting of crosslinkable silicon group-containing polyoxyalkylene polymers and crosslinkable silicon group-containing(meth)acrylic-based polymers The photocurable composition of the present invention preferably further comprises (E) at least one type of fluorine-based compound selected from the group consisting of boron trifluoride, complexes of boron trifluoride, fluorinating agents, and alkali metal salts of polyvalent fluoro compounds.

The photocurable composition of the present invention preferably further comprises (F) an epoxy group-containing silane.

Advantageous Effects of Invention

According to the present invention, a photocurable composition having sufficient usable life and having adhesive properties with respect to an adherend (substrate) that are equivalent to those of the case where aminosilane is included can be provided.

DESCRIPTION OF EMBODIMENTS

Embodiments of the present invention will be described below; however, these embodiments are shown as examples, and it is obvious that various modifications are possible as long as such modifications do not deviate from the technical ideas of the present invention.

The photocurable composition of the present invention is a composition comprising: (A) a crosslinkable silicon group-containing organic polymer; and (B) a crosslinkable silicon group-containing compound that forms, by means of light, at least one type of amino group selected from the group consisting of primary amino groups and secondary amino groups.

The crosslinkable silicon group-containing organic polymer (A) is not particularly limited as long as the crosslinkable silicon group-containing organic polymer is an organic polymer having a crosslinkable silicon group; however, an organic polymer in which the main chain is not polysiloxane and which has various main chain backbones except polysiloxane is preferable from the perspective of containing or generating no low molecular weight cyclic siloxane which becomes a cause of contact failure.

Specific examples thereof include polyoxyalkylene polymers, such as polyoxyethylene, polyoxypropylene, polyoxybutylene, polyoxytetramethylene, polyoxyethylene-polyoxypropylene copolymers, and polyoxypropylene-polyoxybutylene copolymers; hydrocarbon polymers, such as ethylene-propylene copolymers, polyisobutylene, copolymers of isobutylene with isoprene or the like, polychloroprene, polyisoprene, copolymers of isoprene or butadiene with at least one of acrylonitrile, styrene, and the like, polybutadiene, and copolymers of isoprene or butadiene with acrylonitrile, styrene, and the like, and hydrogenated polyolefin polymers obtained by subjecting these polyolefin polymers to hydrogenation; polyester polymers obtained by condensation of a dibasic acid, such as adipic acid, and a glycol, and polyester polymers obtained by ring-opening polymerization of lactones; (meth)acrylate-based polymers obtained by subjecting monomers, such as ethyl (meth) acrylate and butyl (meth)acrylate, to radical polymerization; vinyl polymers obtained by subjecting monomers, such as (meth)acrylate-based monomers, vinyl acetate, acrylonitrile, and styrene to radical polymerization; graft polymers obtained by subjecting the vinyl monomers in the organic polymer to polymerization; polysulfide polymers; polyamide polymers, such as nylon 6 obtained by ring-opening polymerization of ε-caprolactam, nylon 6/6 obtained by polycondensation of hexamethylenediamine and adipic acid, nylon 6/10 obtained by polycondensation of hexamethylenediamine and sebacic acid, nylon 11 obtained by polycondensation of ε-aminoundecanoic acid, nylon 12 obtained by ring-opening polymerization of ε-aminolaurolactam, and copolymer nylons containing two or more components of the nylons described above; polycarbonate polymers produced by polycondensation of bisphenol A and carbonyl chloride, diallyl phthalate polymers; and the like.

Furthermore, saturated hydrocarbon polymers, such as polyisobutylene, hydrogenated polyisoprene, and hydrogenated polybutadiene, polyoxyalkylene polymers, and (meth) acrylate-based polymers are preferable since the glass transition temperature is relatively low and the obtained cured product exhibits excellent cold resistance. Furthermore, polyoxyalkylene polymers and (meth)acrylate-based polymers are particularly preferable from the perspectives of exhibiting high moisture permeability and exhibiting excellent deep-part curability when none-part composition is formed.

The crosslinkable silicon group of the organic polymer (A) used in the present invention is a group that has a hydroxy group or hydrolyzable group bonded to a silicon atom and that can be crosslinked by forming a siloxane bond. As the crosslinkable silicon group, for example, a group represented by general formula (1) below is preferable.

[Chemical Formula 1]

(1)

In Formula (I) above, $R^1$ is a hydrocarbon group having from 1 to 20 carbons, a triorganosiloxy group represented by $R^1{}_3SiO$— ($R^1$ is the same as described above), or a hydrocarbon group having from 1 to 20 carbons in which at least one hydrogen atom on carbon atoms at positions 1 to 3 is substituted with a halogen, —$OR^6$, —$NR^7R^8$, —$N=R^9$, —$SR^{10}$ (each of $R^6$, $R^7$, $R^8$, and $R^{10}$ is a hydrogen atom or a substituted or unsubstituted hydrocarbon group having from 1 to 20 carbons; and $R^9$ is a substituted or unsubstituted divalent hydrocarbon group having from 1 to 20 carbons), perfluoroalkyl group having from 1 to 20 carbons, or cyano group. When two or more $R^1$ moieties exist, these $R^1$ moieties may be the same or different. Examples of the hydrocarbon group having from 1 to 20 carbons include alkyl groups having from 1 to 20 carbons, cycloalkyl groups having from 3 to 20 carbons, aryl groups having from 6 to 20 carbons, aralkyl groups having from 7 to 20 carbons, and the like.

X represents a hydroxy group or hydrolyzable group, and when two or more X moieties exist, these X moieties may be the same or different. a represents 0, 1, 2, or 3, and b represents 0, 1, or 2. Furthermore, p units of b moieties in general formula (2) below are not necessarily the same. p represents an integer of 0 to 19, It should be noted that a+ (sum of b)≥1 is satisfied.

[Chemical Formula 2]

(2)

To one silicon atom, from 1 to 3 groups of the hydrolyzable groups and/or hydroxy groups can be bonded, and a + (sum of b) is preferably in the range of 1 to 5. When two or more groups of the hydrolyzable groups and/or hydroxy groups are bonded within the crosslinkable silicon group, these bonded groups may be the same or different. The number of the silicon atoms constituting the crosslinkable silicon group may be one, or two or more; however, in the case of the silicon atoms linked by siloxane bonding or the like, the number may be approximately 20.

As the crosslinkable silicon group, the crosslinkable silicon group represented by general formula (3) below is preferable from the perspective of being readily available.

[Chemical Formula 3]

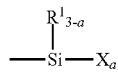
(3)

In Formula (3) above, $R^1$ and X are the same as those described above, and a is an integer of 1, 2, or 3. Taking curability into consideration, to obtain a curable composition having a sufficient cure rate, a is preferably 2 or greater, and more preferably 3, in Formula (3) above.

Specific examples of $R^1$ described above include alkyl groups such as a methyl group and ethyl group, cycloalkyl groups such as a cyclohexyl group, aryl groups such as a phenyl group, aralkyl groups such as a benzyl group, triorganosiloxy groups represented by $R^1{}_3SiO$—, and the like. Among these, a methyl group is preferable.

The hydrolyzable group represented by X described above is not particularly limited, and conventionally known hydrolyzable groups can be used. Specific examples include a hydrogen atom, halogen atoms, alkoxy groups, acyloxy groups, ketoximate groups, amino groups, amide groups, acid amide groups, aminooxy groups, mercapto groups, alkenyloxy groups, and the like. Among these, a hydrogen atom, alkoxy groups, acyloxy groups, ketoximate groups, amino groups, amide groups, aminooxy groups, mercapto groups, and alkenyloxy groups are preferable, and alkoxy groups, amide groups, and aminooxy groups are more preferable. Alkoxy groups are particularly preferable from the perspective of easy handling due to its moderate hydrolyzability. Among alkoxy groups, an alkoxy group having a smaller number of carbons has higher reactivity, and an alkoxy group having a greater number of carbons has lower reactivity, in the following order: methoxy group >ethoxy group>propoxy group. Although the alkoxy group can be selected based on the purpose and/or use, a methoxy group and/or ethoxy group is typically used.

Examples of specific structure of the crosslinkable silicon group include trialkoxysilyl groups [—Si(OR)$_3$], such as a trimethoxysilyl group and triethoxysilyl group, dialkoxysilyl groups [—SiR$^1$(OR)$_2$], such as a methyldimethoxysilyl group and methyldiethoxysilyl group, and a trimethoxysilyl group is more preferable. Note that R is an alkyl group such as a methyl group or ethyl group.

Furthermore, one type of crosslinkable silicon groups may be used or two or more types of these may be used in combination. The crosslinkable silicon group may be present in the main chain and/or side chain.

The number of the silicon atoms constituting the crosslinkable silicon group is one or more; however, in the case of the silicon atoms linked by siloxane bonding or the like, the number is preferably 20 or less.

The organic polymer having a crosslinkable silicon group may be a straight chain or may have a branch, and the number average molecular weight determined by GPC based on calibration with polystyrene is approximately from 500 to 100,000, more preferably from 1,000 to 50,000, and particularly preferably from 3,000 to 30,000. When the number average molecular weight is less than 500, undesirable tendencies may be observed in elongation characteristics of the cured product. When the number average molecular weight is greater than 100,000, undesirable tendencies may manifest in workability due to its high viscosity.

To obtain a rubber-like cured product exhibiting a high strength, high elongation, and low elastic modulus, the number of the crosslinkable silicon groups contained in the organic polymer is, on average, 0.5 groups or greater, preferably 0.8 groups or greater, more preferably 1.0 group or greater, and even more preferably 1.1 groups or greater, per one molecule of the polymer. When the number of the crosslinkable silicon groups contained in the molecule is less than 0.5 groups on average, curability becomes insufficient, and exhibition of suitable elastic behavior of the rubber becomes difficult.

Furthermore, to obtain a rubber-like cured product exhibiting high elongation and low elastic modulus, the number of the crosslinkable silicon groups contained in the molecule is preferably 20 or less, more preferably 10 or less, even more preferably 5 or less, and particularly preferably 3 or less. When the number of the crosslinkable silicon group contained in the molecule is greater than 20 groups on average, the cured product becomes too hard, and exhibition of suitable elastic behavior of the rubber becomes difficult.

The crosslinkable silicon group may be present at a terminal of the main chain and/or a terminal of a side chain of the organic polymer molecular chain. In particular, when the crosslinkable silicon group is only present at a terminal of the main chain of the molecular chain, a rubber-like cured product exhibiting a high strength, high elongation, and low elastic modulus tends to be easily obtained since the effective network length of the organic polymer component contained in the cured product that is formed eventually is longer.

The polyoxyalkylene polymer is a polymer having repeating units essentially represented by general formula (4) below, $$—R^2O—$$ (4)

In general formula (4) above, $R^2$ represents a straight or branched alkylene group having from 1 to 14 carbons. $R^2$ is preferably a straight or branched alkylene group having from 1 to 14 carbons, and more preferably from 2 to 4 carbons Specific examples of the repeating units represented by general formula (4) include
—CH$_2$O—, —CH$_2$CH$_2$O—, —CH$_2$CH(CH$_3$)O—, —CH$_2$CH(C$_2$H$_5$)O—, —CH$_2$C(CH$_3$)$_2$O—, —CH$_2$CH$_2$CH$_2$CH$_2$O—, and the like. The main chain backbone of the polyoxyalkylene polymer may be formed from only one type of the repeating units or may be formed from two or more types of the repeating units. In particular, when the photocurable composition of the present invention is used in a sealing material or, the like, the organic polymer formed from a polymer having a propylene oxide polymer as its main component is preferable from the perspectives of being amorphous and having a relatively low viscosity.

Examples of the method of synthesizing the polyoxyalkylene polymer include polymerization methods using an alkaline catalyst, such as KOH, polymerization methods by an organoaluminum-porphyrin complex catalyst obtained by reacting an organoaluminum compound with porphyrin, such as those described in Japanese Unexamined Patent Application Publication No. S61-197631A, Japanese Unexamined Patent Application Publication No. S61-215622A, and Japanese Unexamined Patent Application Publication No. S61-215623A, polymerization methods by a double metal cyanide complex catalyst, such as those described in Japanese Examined Patent Application Publication No. S46-27250B and Japanese Examined Patent Application Publication No. S59-15336B, and the like. However, the synthesizing method is not particularly limited. Using the polymerization method by an organoaluminum-porphyrin complex catalyst or the polymerization method by a double metal cyanide complex catalyst, a polyoxyalkylene polymer having a high molecular weight of a number average molecular weight of 6,000 or greater and having a narrow molecular weight distribution of Mw/Mn of 1.6 or less can be obtained.

Other components, such as an urethane bonding component, may be included in the main chain backbone of the polyoxyalkylene polymer. Examples of the urethane bonding component include aromatic polyisocyanate, such as toluene (tolylene) diisocyanate, diphenylmethane diisocyanate, and xylylene diisocyanate; substances obtained by reaction with a polyoxyalkylene polymer having a hydroxy group with aliphatic polyisocyanate, such as isophorone diisocyanate and hexamethylene diisocyanate.

Introduction of the crosslinkable silicon group to the polyoxyalkylene polymer can be performed by reacting a polyoxyalkylene polymer having a functional group, such as an unsaturated group, hydroxy group, epoxy group, or isocyanate group, in the molecule with a compound having a crosslinkable silicon group and another functional group that is reactive to this functional group (hereinafter, referred to as "polymer reaction method").

Specific examples of the polymer reaction method include a method, in which hydrosilane having a crosslinkable silicon group or a mercapto compound having a crosslinkable silicon group is applied to an unsaturated group-containing polyoxyalkylene polymer to perform hydrosilylation or mercaptization to obtain a polyoxyalkylene polymer having a crosslinkable silicon group. The unsaturated group-containing polyoxyalkylene polymer can be obtained by reacting an organic polymer having a functional group, such as a hydroxy group, with an organic compound having an active group that exhibits reactivity to this functional group and an unsaturated group.

Other specific examples of polymer reaction method include a method in which a polyoxyalkylene polymer having a hydroxy group at a terminal is reacted with a compound having isocyanate group and having a crosslinkable silicon group, and a method in which a polyoxyalkylene polymer having an isocyanate group at a terminal is reacted with a compound having an active hydrogen group, such as a hydroxy group and an amino group, and having a crosslinkable silicon group. By using an isocyanate compound, a polyoxyalkylene polymer having a crosslinkable silicon group can be easily obtained.

Specific examples of the polyoxyalkylene polymer having a crosslinkable silicon group include those proposed in each of the publications including Japanese Examined Patent Application Publication No. S45-36319B, Japanese Examined Patent Application Publication No. S46-12154B, Japanese Unexamined Patent Application Publication No. S50-156599A, Japanese Unexamined Patent Application Publication No. S54-6096A, Japanese Unexamined Patent Application Publication No. S55-13767A, Japanese Unexamined Patent Application Publication No. S57-164123A, Japanese Examined Patent Application Publication No. H3-2450B, Japanese Unexamined. Patent Application Publication No. 2005-213446A, Japanese Unexamined Patent Application Publication No. 2005-306891A, WO/2007/040143, U.S. Pat. Nos. 3,632,557B, 4,345,053B, 4,960,844B, and the like.

The polyoxyalkylene polymers having a crosslinkable silicon group described above may be used alone, or two or more types of these may be used in combination, The saturated hydrocarbon polymer is a polymer substantially free of carbon-carbon unsaturated bond, except aromatic rings, and a polymer constituting the backbone thereof can be obtained by (1) polymerizing olefin compounds having from 2 to 6 carbons, such as ethylene, propylene, 1-butene, and isobutylene, as a main monomer, or (2) homopolymerizing diene compounds, such as butadiene and isoprene or copolymerizing such diene compounds with the olefin compounds described above, and then performing hydrogenation, or the like. However, isobutylene polymers and hydrogenated polybutadiene polymers are preferable since a functional group is easily introduced at a terminal, thereby making it easy to control the molecular weight, and since the number of terminal functional groups can be increased, and isobutylene polymers are particularly preferable.

A material in which the main chain backbone is a saturated hydrocarbon polymer exhibits excellent heat resistance, weather resistance, durability, and moisture shielding property.

All of the monomer units of the isobutylene polymer may be isobutylene units or the isobutylene polymer may be a copolymer formed with other monomers; however, from the perspective of rubber characteristics, the isobutylene polymer preferably contains at least 50% by mass, more preferably contains at least 80% by mass, and particularly preferably contains from 90 to 99% by mass, of repeating units derived from isobutylene.

As the method of synthesizing a saturated hydrocarbon polymer, various polymerization methods have been reported conventionally; however, particularly in recent years, many so-called living polymerization methods have been developed. In the case of a saturated hydrocarbon polymer, in particular isobutylene polymer, it has been known that easy production is possible by the inifer polymerization found by Kennedy et al. (J. P. Kennedy et al., J. Polymer Sci., Polymer Chem. Ed., 1997, vol. 15, p. 2843), and a molecular weight of approximately from 500 to 100,000 and a molecular weight distribution of 1.5 or less can be achieved by the polymerization, and various functional groups can be introduced to the molecular terminals.

The method of producing a saturated hydrocarbon polymer having a crosslinkable silicon group is not particularly limited; however, examples of the methods include those described in specifications of Japanese Examined Patent Application Publication No. H4-69659B, Japanese Examined Patent Application Publication No. H7-108928B, Japanese Unexamined Patent Application Publication No. S63-254149A, Japanese Unexamined Patent Application Publication No. S64-22904A, Japanese Unexamined Patent Application Publication No. H1-197509A, Japanese Patent No. 2539445B, Japanese Patent No. 2873395B, and Japanese Unexamined Patent Application Publication No. H7-53882A.

The saturated hydrocarbon polymers having a crosslinkable silicon group described above may be used alone, or two or more types of these may be used in combination.

A (meth)acrylate-based monomer constituting the main chain of the (meth)acrylate-based polymer is not particularly limited, and various types of substances can be used. Examples thereof include (meth)acrylic acid; alkyl (meth)

acrylate-based monomers, such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, and stearyl (meth)acrylate; alicyclic (meth)acrylate-based monomers, such as cyclohexyl (meth)acrylate, isobornyl (meth)acrylate, dicyclopentenyloxyethyl (meth)acrylate, dicyclopentanyl (meth)acrylate, t-butylcyclohexyl (meth)acrylate, tetrahydrofurfuryl (meth)acrylate, tetramethylpiperidinyl (meth)acrylate, and pentamethylpiperidinyl (meth)acrylate; aromatic (meth)acrylate-based monomers, such as phenyl (meth)acrylate, tolyl (meth)acrylate, benzyl (meth)acrylate, phenoxyethyl (meth)acrylate, nonylphenoxypolyethylene glycol (meth)acrylate, paracumylphenoxyethylene glycol (meth)acrylate, hydroxyethylated o-phenylphenol (meth)acrylate, 2-hydroxy-3-phenoxypropyl (meth)acrylate, phenoxydiethylene glycol (meth)acrylate, phenoxypolyethylene glycol (meth)acrylate, and phenylthioethyl (meth)acrylate; (meth)acrylate-based monomers, such as 2-methoxyethyl (meth)acrylate, 3-methoxybutyl (meth)acrylate, 2-hydroxyethyl (meth)acrylate, 2-hydroxypropyl (meth)acrylate, glycidyl (meth)acrylate, and 2-aminoethyl (meth)acrylate; silyl group-containing (meth)acrylate-based monomers, such as γ-(methacryloyloxypropyl)trimethoxysilane, γ-(methacryloyloxypropyl)dimethoxymethylsilane, methacryloyloxymethyl trimethoxysilane, methacryloyloxymethyl triethoxysilane, methacryloyloxymethyl dimethoxymethylsilane, and methacryloyloxymethyl diethoxymethylsilane; derivatives of (meth)acrylates, such as ethylene oxide adducts of (meth)acrylate; fluorine-containing (meth)acrylate-based monomers, such as trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, perfluoroethyl acrylate, trifluoromethyl (meth)acrylate, bis(trifluoromethyl)methyl (meth)acrylate, 2-trifluoromethyl-2-perfluoroethylethyl (meth)acrylate, 2-perfluorohexylethyl (meth)acrylate, 2-perfluorodecylethyl (meth)acrylate, and 2-perfluorohexadecylethyl (meth)acrylate, and the like.

For the (meth)acrylate-based polymer, other monomers such as vinyl monomers can be copolymerized with (meth)acrylate-based monomers. Examples of the vinyl monomer include styrene-based monomers, such as styrene, vinyl toluene, α-methyl styrene, chlorostyrene, styrene sulfonic acid, and salts thereof; fluorine-containing vinyl monomers, such as perfluoro ethylene, perfluoro propylene, and vinylidene fluoride; silicon-containing vinyl monomers, such as vinyltrimethoxysilane and vinyltriethoxysilane; maleic anhydride, maleic acid, and monoalkyl esters and dialkyl esters of maleic acid; fumaric acid and monoalkyl esters and dialkyl esters of fumaric acid; maleimide-based monomers, such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers, such as acrylonitrile and methacrylonitrile; amide group-containing vinyl monomers, such as acryl amide and methacrylamide; vinyl esters, such as vinyl acetate, vinyl propionate, vinyl pivalate, vinyl benzoate, and vinyl cinnamate; alkenes, such as ethylene and propylene; conjugated dienes, such as butadiene and isoprene; vinyl chloride, vinylidene chloride, allyl chloride, allyl alcohol, and the like.

These may be used alone, or a plurality of these may be copolymerized. Among these, from the perspective of physical properties of the resulting material or the like, a polymer formed from styrene-based monomers and (meth)acrylic acid-based monomers is preferable. A (meth)acrylic-based polymer formed from acrylate monomers and methacrylate monomers is more preferable, and an acrylic-based polymer formed from acrylate monomers is particularly preferable. A (meth)acrylate-based polymer in which one type or two or more types of alkyl (meth)acrylate-based monomers, and optional other (meth)acrylic-based monomers, are used together is more preferable, and by using silyl group-containing (meth)acrylate-based monomers together, the number of silicon groups in the (meth)acrylate-based polymer (A) can be controlled. From the perspective of achieving excellent adhesive properties, a methacrylate polymer formed from methacrylate monomers is particularly preferable. Furthermore, to reduce viscosity, to impart flexibility, and/or to impart pressure-sensitive adhesion, it is suitable to appropriately use acrylate monomers. Note that, in the present specification, "(meth)acrylic acid" refers to acrylic acid and/or methacrylic acid.

Since, in the use for general construction, physical properties such as low viscosity of blended materials, low modulus of the cured product, high elongation, high weather resistance, and high heat resistance are required, butyl acrylate monomers are even more preferable. On the other hand, for the use that requires oil resistance or the like, such as use for automobiles, copolymers mainly containing ethyl acrylate are even more preferable. Since the polymers mainly containing ethyl acrylate tend to exhibit slightly poor low temperature characteristics (cold resistance) although the polymers have excellent oil resistance, apart of ethyl acrylate can be substituted with butyl acrylate to enhance the low temperature characteristics. However, as the proportion of butyl acrylate increases, the suitable oil resistance is impaired, and thus the proportion is preferably 40% or less, and more preferably 30% or less, for uses that require oil resistance. To enhance the low temperature characteristics or the like without impairing oil resistance, use of 2-methoxyethyl acrylate, 2-ethoxyethyl acrylate, or the like, in which oxygen is introduced to an alkyl group of the side chain, is also preferable. However, since heat resistance tends to be impaired when an alkoxy group having ether bonding on its side chain is introduced, when the heat resistance is required, the proportion thereof is preferably set to 40% or less. Taking the required physical properties, such as oil resistance, heat resistance, and low temperature characteristics, into consideration depending on uses and required purposes, suitable polymers can be obtained by varying the proportion. For example, although it is not limited, an example in which the balance of the physical properties, such as oil resistance, heat resistance, and low temperature characteristics, is excellent is a copolymer of ethyl acrylate/butyl acrylate/2-methoxyethyl acrylate (in terms of mass ratio, from 40 to 50/from 20 to 30/from 30 to 20). In the present invention, these preferable monomers may be copolymerized, or block-copolymerized, with other monomers, and in this case, these preferable monomers are preferably contained at a mass ratio of 40% or greater.

In the present invention, the method of obtaining (meth) acrylate polymer is not particularly limited. Publicly known polymerization methods (e.g. synthesizing methods described in Japanese Unexamined Patent Application Publication No. S63-112642A, Japanese Unexamined Patent Application Publication No. 2007-230947A, Japanese Unexamined Patent Application Publication No. 2001-

40037A, and Japanese Unexamined Patent Application Publication No. 2003-313397A and the like) can be used, and a radical polymerization method that employs a radical polymerization reaction is preferable. Examples of the radical polymerization method include a radical polymerization method in which predetermined monomer units are copolymerized using a polymerization initiator (free radical polymerization method), and a controlled radical polymerization method that can introduce a reactive silyl group to a controlled position, such as at a terminal. However, polymers obtained by an ordinary free radical polymerization method that uses an azo-based compound, peroxide, or the like as a polymerization initiator have a problem of high viscosity caused by the large molecular distribution value which is typically 2 or greater. Therefore, to obtain (meth) acrylate-based polymer having a narrow molecular weight distribution and low viscosity, and having crosslinkable functional groups at molecular chain terminals at a high proportion, use of a controlled radical polymerization method is preferable.

Examples of the controlled radical polymerization method include free radical polymerization methods, in which a chain transfer agent having a particular functional group is used, and living radical polymerization methods. Living radical polymerization methods, such as atom transfer radical polymerization (ATRP) and reversible addition-fragmentation chain transfer (RAFT) polymerization (Japanese Unexamined Patent Application Publication No. 2005-232419A and Japanese Unexamined Patent Application Publication No. 2006-291073A) are more preferable. Furthermore, reactions using a thiol compound having a crosslinkable silicon group and reactions using a thiol compound having a crosslinkable silicon group and a metallocene compound (Japanese Unexamined Patent Application Publication No. 2001-40037A) are also preferable.

In the atom transfer radical polymerization, an organic halides, in particular an organic halide having a highly reactive carbon-halogen bond (e.g. a carbonyl compound having halogen at the α-position or a compound having halogen at a benzyl position), a halogenated sulfonyl compound, or the like is preferably used as an initiator. To obtain a vinyl polymer having at least two alkenyl groups, which can undergo hydrosilylation reaction, in a molecule, an organic halide having at least two initiation points or a halogenated sulfonyl compound is preferably used as an initiator.

(Meth)acrylic-based monomers or vinyl monomers used in the atom transfer radical polymerization are not particularly limited, and all of the (meth)acrylic-based monomers and vinyl monomers that are exemplified can be suitably used.

The (meth)acrylate-based polymers having a crosslinkable silicon group may be used alone, or two or more types of these may be used in combination.

These organic polymers having a crosslinkable silicon group may be used alone, or two or more types of these may be used in combination. Specifically, an organic polymer formed by blending at least two types selected from the group consisting of polyoxyalkylene polymers having a crosslinkable silicon group, saturated hydrocarbon polymers having a crosslinkable group, and (meth)acrylate-based polymers having a crosslinkable silicon group can also be used.

Methods of producing an organic polymer formed by blending a polyoxyalkylene polymer having a crosslinkable silicon group and a (meth)acrylate-based polymer having a crosslinkable silicon group are proposed in Japanese Unexamined Patent Application Publication No. S59-122541A, Japanese Unexamined Patent Application Publication No. S63-112642A, Japanese Unexamined Patent Application Publication No. H6-172631A, Japanese Unexamined Patent Application Publication No. H 11-116763A, and the like; however, the method is not particularly limited to these. The preferable specific example is a production method in which a polyoxyalkylene polymer having a crosslinkable silicon group is blended to a copolymer that has a crosslinkable silicon group and a molecular chain substantially formed from (meth)acrylate monomer units represented by general formula (5) below:

$$—CH_2—C(R^3)(COOR^4)— \quad (5)$$

(in the formula, $R^3$ represents a hydrogen atom or a methyl group, and $R^4$ represents an alkyl group having from 1 to 8 carbons), and (meth)acrylate monomer units represented by general formula (6) below:

$$—CH_2—C(R^3)(COOR^5)— \quad (6)$$

(in the formula, $R^3$ represents the same as described above, and $R^5$ represents an alkyl group having at least 10 carbons).

Examples of $R^4$ of genera formula (5) above include alkyl groups having from 1 to 8 carbons, such as a methyl group, ethyl group, propyl group, n-butyl group, t-butyl group, and 2-ethylhexyl group, more preferably alkyl groups having from 1 to 4 carbons, and even more preferably alkyl groups having 1 or 2 carbons. Note that alkyl groups of $R^4$ may be a single type or a mixture of two or more types.

Examples of $R^5$ of general formula (6) above include long-chain alkyl groups having at least 10 carbons, such as a lauryl group, tridecyl group, cetyl group, stearyl group, and behenyl group, typically alkyl groups having from 10 to 30 carbons, and preferably alkyl groups having 10 or 20 carbons. Note that, in the same manner as in the case of $R^4$, alkyl groups of $R^5$ may be a single type or a mixture of two or more types.

Although the molecular chain of the (meth)acrylate-based copolymer is substantially formed from the monomer units of Formula (5) and Formula (6), note that "substantially" indicates that the total amount of the monomer units of Formula (5) and Formula (6) present in the copolymer exceeds 50% by mass. The total amount of the monomer units of Formula (5) and Formula (6) is preferably 70% by mass or greater. Furthermore, the abundance ratio of the monomer units of Formula (5) to the monomer units of Formula (6) is, in terms of mass ratio, preferably from 95:5 to 40:60, and more preferably from 90:10 to 60:40.

Examples of monomer units, except the monomer units of Formula (5) and Formula (6), that may be included in the copolymer (hereinafter, also referred to as "other monomer units") include α- and β-unsaturated carboxylic acids, such as acrylic acid and methacrylic acid; amide groups, such as acrylamide, methacrylamide, N-methylolacrylamide, and N-methylolmethacrylamide, epoxy groups, such as glycidyl acrylate and glycidyl methacrylate, and amino group-containing monomers, such as diethylaminoethylacrylate, diethylaminoethylmethacrylate, and aminoethyl vinyl ether; monomer units derived from other acrylonitrile, styrene, α-methylstyrene, alkyl vinyl ether, vinyl chloride, vinyl acetate, vinyl propionate, ethylene, and the like.

As the (meth)acrylate-based polymer having a crosslinkable silicon group used in the method of producing the organic polymer formed by blending the polyoxyalkylene polymer having a crosslinkable silicon group with the (meth)acrylate-based polymer having a crosslinkable silicon group, publicly known (meth)acrylate-based copolymers, such as a (meth)acrylate-based copolymer that has a crosslinkable silicon group and a molecular chain substantially containing (a1) alkyl (meth)acrylate monomer units containing an alkyl group having from 1 to 8 carbons and (a2) alkyl (meth)acrylate monomer units containing an alkyl group having at least 10 carbons (disclosed in Japanese Unexamined Patent Application Publication No. S63-112642A), can also be used.

The molecular chain of the acrylic copolymer is preferably an acrylic copolymer containing the total of 50% by mass or greater of the monomer units (a1) and the monomer units (a2), and more preferably an acrylic copolymer containing the total of 70% by mass or greater of the monomer units (a1) and the monomer units (a2). The abundance ratio of the (a1) to the (a2), in terms of mass ratio, is preferably (a1)/(a2)=90/10 to 20/80, and more preferably 70/30 to 30/70. The mass ratio of (a1)/(a2) within the range of 90/10 to 20/80 can enhance transparency.

The acrylic copolymer may contain other monomer units other than the (a1) and (a2). As the monomer units other than (a1) and (a2), for example, other monomer units described above for the description of the (meth)acrylate-based copolymer can be similarly used.

The number average molecular weight of the (meth) acrylate-based polymer is preferably from 600 to 10,000, more preferably from 600 to 5,000, and even more preferably from 1,000 to 4,500. By setting the number average molecular weight to be within the range, miscibility with the polyoxyalkylene polymer having, a crosslinkable silicon group can be enhanced. The (meth)acrylate-based polymers may be used alone, or two or more types of these may be used in combination. The compounding ratio of the polyoxyalkylene polymer having a crosslinkable silicon group to the (meth)acrylate-based polymer having, a crosslinkable silicon group is not particularly limited; however, the amount of the (meth)acrylate-based polymer is preferably in the range of 10 to 60 parts by mass, more preferably in the range of 20 to 50 parts by mass, and even more preferably in the range of 25 to 45 parts by mass, per 100 parts by mass total of the (meth)acrylate-based polymer and the polyoxyalkylene polymer. The amount of the (meth)acrylate-based polymer of greater than 60 parts by mass is not preferable since the viscosity becomes high and thus workability becomes poor.

Organic polymers formed by blending a saturated hydrocarbon polymer having a crosslinkable silicon group and a (meth)acrylate-based copolymer having a crosslinkable silicon group are proposed in Japanese Unexamined Patent Application Publication No. H1-168764A, Japanese Unexamined Patent Application Publication No. 2000-186176A, and the like; however, the organic polymer is not particularly limited to these.

Furthermore, as another method of producing the organic polymer formed by blending the (meth)acrylate-based copolymer having a crosslinkable silicon group, a method in which polymerization of (meth)acrylate-based monomers is performed in the presence of an organic polymer having a crosslinkable silicon group can be used. This production method is specifically disclosed in each of the publications including Japanese Unexamined Patent Application Publication No. S59-78223A, Japanese Unexamined Patent Application Publication No. S59-168014A, Japanese Unexamined Patent Application Publication No. S60-228516A, Japanese Unexamined Patent Application Publication No. S60-228517A, and the like; however, the method is not limited to these.

When two or more types of polymers are blended for use, preferably from 10 to 200 parts by mass, and more preferably from 20 to 80 parts by mass, of the saturated hydrocarbon polymer having a crosslinkable silicon group and/or the (meth)acrylate-based polymer having a crosslinkable silicon group is used per 100 parts by mass of the polyoxyalkylene polymer having a crosslinkable silicon group.

The compounded amount of the (A) crosslinkable silicon group-containing organic polymer in the photocurable composition of the present invention is not particularly limited; however, the composition contains preferably from 20% by mass to 99% by mass, more preferably from 50% by mass to 95% by mass, and most preferably from 70% by mass to 95% by mass, of (A) crosslinkable silicon group-containing organic polymer, in terms of solid content.

As (B) a crosslinkable silicon group-containing compound that forms, by means of light, at least one type of amino group selected from the group consisting of primary amino groups and secondary amino groups, any compounds that form, by light irradiation, at least one type of amino group selected from the group consisting of primary amino groups and secondary amino groups, and that form an aminosilane compound having a crosslinkable silicon group can be used. In the present specification, (B) the crosslinkable silicon group-containing compound that forms, by means of light, at least one type of amino group selected from the group consisting of primary amino groups and secondary amino groups is also referred to as "aminosilane-generating compound via light".

As the aminosilane compound generated by the light irradiation, a compound having a crosslinkable silicon group and a substituted or unsubstituted amino group is used. The substituent of the substituted amino group is not particularly limited, and examples thereof include alkyl groups, aralkyl groups, aryl groups, and the like. Furthermore, the crosslinkable silicon group is not particularly limited, and the crosslinkable silicon groups described in the section of (A) organic polymer are also exemplified. A silicon-containing group to which a hydrolyzable group is bonded is preferable. Among these, alkoxy groups such as a methoxy group and an ethoxy group are preferable from the perspectives of moderate hydrolyzability and easy handling. In the aminosilane compound, from 1 to 3 groups, preferably at least 2 groups, and particularly preferably 3 groups, of the hydrolyzable groups and/or the hydroxy aroups can be bonded to one silicon atom.

The aminosilane compound generated by the light irradiation is not particularly limited, and examples thereof include monoamines, such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, 3-(N-ethylamino)-2-methylpropyltrimethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, and N-phenylaminomethyltrimethoxysilane; diamines, such as γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(6-aminohexyl)aminopropyltrimethoxysilane, (2-aminoethyl)aminomethyltrimethoxysilane, and N,N'-bis[3-

(trimethoxysilyl)propyl]ethylenediamine; triamines, such as γ-(2-(2-aminoethyl)aminoethyl)aminopropyltrimethoxysilane; and the like.

Among the aminosilane compounds generated by the light irradiation, aminosilane compounds having a primary amino group (—NH$_2$) are preferable from the perspective of adhesive properties; γ-aminopropyltrimethoxysilane, γ-aminopropyltriethoxysilane, γ-aminopropylmethyldimethoxysilane, and γ-(2-aminoethyl)aminopropyltrimethoxysilane are preferable from the perspective of availability; and γ-aminopropyltrimethoxysilane and γ-aminopropyltriethoxysilane are more preferable from the perspectives of adhesive properties and curability.

Examples of the aminosilane-generating compound via light include silicon compounds having a photofunctional group represented by Formulas (I) and (II) below, aromatic sulfonamide derivatives represented by Formula (III) below, O-acyloxime derivatives represented by Formula (IV) below, trans-o-coumaric acid derivatives represented by Formula (V) below, and the like.

[Chemical Formula 4]

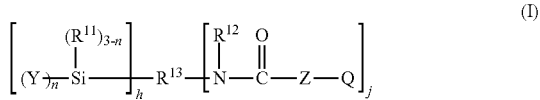

(I)

In Formula (I) above, n is an integer of 1 to 3, and Y represents a hydroxy group or a hydrolyzable group, and preferably represents an alkoxy group. When a plurality of the Y moieties exists, these may be the same or different. $R^{11}$ represents a hydrocarbon group having from 1 to 20 carbons or a hydrocarbon group having a substituent, and a vinyl group, allyl group, unsubstituted or substituted alkyl group having from 1 to 10 carbons, and unsubstituted or substituted aryl group are preferable. When a plurality of the $R^{11}$ moieties exists, these may be the same or different. $R^{12}$ represents a hydrogen atom or an organic group. A hydrogen atom, hydrocarbon group having from 1 to 20 carbons, and hydrocarbon group having a substituent are preferable, and a hydrogen atom is more preferable. h is an integer of 1 to 5, and j is an integer of 1 to 6. $R^{13}$ is a group having a valence number of h+j selected from the group consisting of a substituted or unsubstituted hydrocarbon group having the carbon number of h+j and each of the carbons bonds to the silicon atom or the nitrogen atom, and a plurality of substituted or unsubstituted hydrocarbon groups that are bonded to each other via at least one ether oxygen atom. The molecular weight of $R^{13}$ is 1,000 or less. $R^{12}$ and $R^{13}$ may be bonded to each other to form a cyclic structure and may contain a hetero atom bond. Z represents an oxygen atom or sulfur atom, and preferably an oxygen atom. Q represents a photofunctional group,

[Chemical Formula 5]

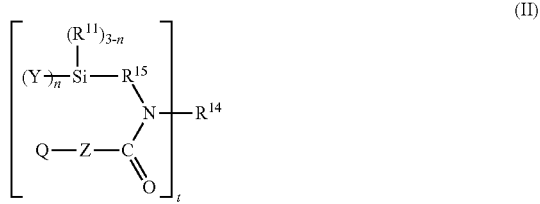

(II)

In Formula (11) above, n, Y, $R^{11}$, Z, and Q are the same as those described for Formula (I) above. $R^{15}$ is a divalent group selected from the group consisting of a substituted or unsubstituted hydrocarbon group and a plurality of substituted or unsubstituted hydrocarbon groups that are bonded to each other via at least one ether oxygen atom. t is an integer of at least 1, and preferably an integer of 1 or 2. When t is 2 or greater, the "t" number of the groups that are bonded to $R^{14}$ may be the same or different. $R^{14}$ represents a hydrogen atom or an organic group. A hydrogen atom or substituted or unsubstituted hydrocarbon group having the valence number of "t" is preferable, and a hydrogen atom or substituted or unsubstituted alkyl group having the valence number of "t" is more preferable. $R^{14}$ and $R^{15}$ may be bonded to each other to form a cyclic structure and may contain a hetero atom bond.

[Chemical Formula 6]

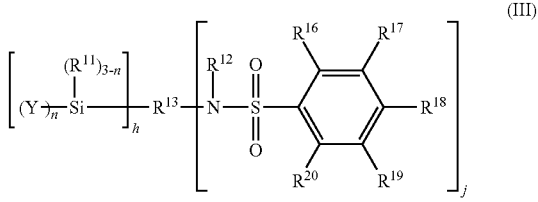

(III)

In Formula (III) above, n, Y, $R^{11}$ to $R^{13}$, h and j are the same as those described for Formula (I) above. $R^{16}$ to $R^{20}$ each independently represent a hydrogen atom or a substituent. Examples of the substituent include a nitro group, cyano group, hydroxy group, mercapto group, halogen atom, acetyl group, carbonyl group, substituted or unsubstituted allyl group, substituted or unsubstituted alkyl group (preferably an alkyl group having from 1 to 5 carbons), substituted or unsubstituted alkoxy group (preferably an alkoxy group having from 1 to 5 carbons), unsubstituted or substituted aryl group, unsubstituted or substituted aryloxy group, heterocyclic structure-containing group, group having a plurality of rings, combinations of these, and the like. Any one of $R^{16}$ to $R^{20}$ may be bonded to each other to form a cyclic structure. When any one of $R^{16}$ to $R^{20}$ are bonded to each other and form a cyclic structure, a structure in which a plurality of benzene rings are condensed, a structure in which a benzene ring and a heterocyclic ring, a non-aromatic ring, a ring to which a functional group such as a carbonyl group is bonded, and the like are condensed, or the like may be formed.

[Chemical Formula 7]

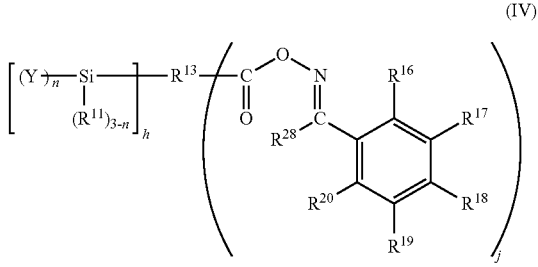

(IV)

In Formula (IV) above, n, Y, $R^{11}$, $R^{13}$, h and j are the same as those described for Formula (I) above, and $R^{16}$ to $R^{20}$ are the same as those described for Formula (III) above. $R^{28}$ is the same as those described for $R^{16}$ to $R^{20}$ of Formula (III) above.

[Chemical Formula 8]

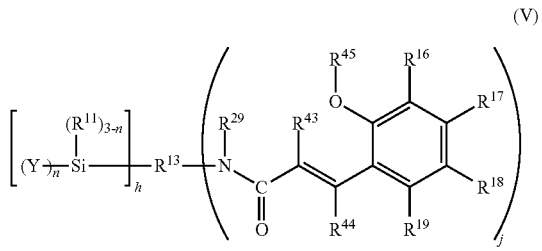

(V)

In Formula (V) above, n, Y, $R^{11}$, $R^{13}$, h and j are the same as those described for Formula (I) above, and $R^{16}$ to $R^{19}$ are the same as those described for Formula (III) above. $R^{29}$ represents a hydrogen atom or an organic group. A hydrogen atom, hydrocarbon group having from 1 to 20 carbons, and hydrocarbon group having a substituent are preferable, and a hydrogen atom is more preferable. $R^{13}$ and $R^{29}$ may be bonded to each other to form a cyclic structure and may contain a hetero atom bond. $R^{43}$ and $R^{44}$ each independently represent a hydrogen atom, halogen atom, hydroxy group, mercapto group, sulfide group, silyl group, silanol group, nitro group, nitroso group, sulfino group, sulfo group, sulfonate group, phosphino group, phosphinyl group, phosphono group, phosphonate group, or organic group. A hydrogen atom, nitro group, cyano group, hydroxy group, mercapto group, halogen atom, acetyl group, allyl group, alkyl group having from 1 to 5 carbons, alkoxy group having from 1 to 5 carbons, unsubstituted or substituted aryl group, and aryloxy group are preferable. $R^{45}$ represents a hydrogen atom or a substituent. A hydrogen atom and protecting group that can deprotect via heating and/or light irradiation are preferable, and a hydrogen atom, silyl group, silanol group, phosphino group, phosphinyl group, phosphono group, and organic group are more preferable.

In Formulas (I) to (V) above, examples of the unsubstituted or substituted alkyl group having from 1 to 10 carbons (or from 1 to 5 carbons) include a methyl group, ethyl group, n-propyl group, n-butyl group, tert-butyl group, n-pentyl group, chloromethyl group, chloroethyl group, fluoromethyl group, cyanomethyl group, and the like. Examples of the alkoxy group having from 1 to 5 carbons include a methoxy group, ethoxy group, n-propoxy group, n-butoxy group, and the like. Examples of the unsubstituted or substituted aryl group include a phenyl group, p-methoxyphenyl group, p-chlorophenyl group, p-trifluoromethylphenyl group, and the like. Examples of the aryloxy group include a phenoxy group and the like.

The photofunctional group Q is not particularly limited and examples thereof include publicly known photosensitive groups. Examples thereof include groups having a cyclic structure represented by Formula (VI) below, and oxime groups represented by Formula (VII) below, and substituted groups of these, and groups having a cyclic structure represented by Formula (VI) below are preferable.

-A-Q'  (VI)

In Formula (VI) above, A represents a direct bond or a divalent linking group, and Q represents acyclic structure-containing group. "Direct bond" refers to a condition where Q is directly bonded to Z via no linking group. Examples of the divalent linking group of A include divalent linking groups such as alkylene groups, carbonyl groups, ether bonding, ester bonding, a —CONH— group, and combination of these, and these may each have a substituent. Alkylene groups or carbonyl groups that may have a substituent and combinations of these are preferable. Furthermore, a substituent of A may have a cyclic structure, or substituents may be bonded to each other to form a cyclic structure. Examples of the cyclic structure include the same substances as those described for Q'.

The cyclic structure of Q' may be any single ring or multi-ring structure and may be any homocyclic or heterocyclic structure; however, the cyclic structure of Q' preferably contains a functional group, such as a vinyl group, carbonyl group, and imino group, and more preferably contains a cyclic structure exhibiting aromatic properties. Examples of Q' include aryl groups, aryloxy groups, heterocyclic groups having at least one type of hetero atoms such as nitrogen, oxygen, and sulfur, groups having a cyclic structure to which a carbonyl group is bonded, combination of these, condensed rings of these, and the like; and these may each have a substituent. Furthermore, the substituent may further have a cyclic structure. Furthermore, the substituent of A and Q' may be bonded to each other.

[Chemical Formula 9]

(VII)

In Formula (VII) above, $R^{41}$ and $R^{42}$ each independently represent at least one type selected from the group consisting of a hydrogen atom, halogen atom, hydroxy group, mercapto group, nitro group, amino group, substituted or unsubstituted alkyl group having from 1 to 50 carbons, alkyloxy group, substituted or unsubstituted alkenyl group having from 2 to 50 carbons, alkenyloxy group, substituted or unsubstituted aryl group having from 4 to 50 carbons, and aryloxy group. $R^{41}$ and $R^{42}$ may be bonded to each other to form a double bond or an aromatic or non-aromatic ring. On $R^{41}$, $R^{42}$, or the double bond or the aromatic or non-aromatic ring formed by bonding $R^{41}$ and $R^{42}$, one or two oxime groups represented by the formula above may be further formed.

Examples of the group having a cyclic structure represented by Formula (VI) above include aromatic groups represented by Formula (VIII) below, groups having a heterocyclic structure, and groups in which these are substituted, and aromatic groups are preferable. Furthermore, groups in the photofunctional group may be bonded to each other to form a cyclic structure.

[Chemical Formula 10]

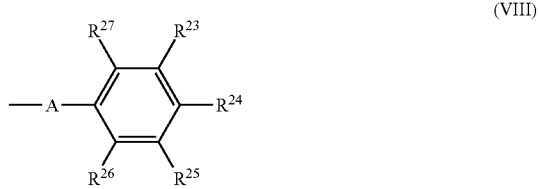

(VIII)

In Formula (VIII) above, A is the same as A of Formula (VI) above, and is preferably a substituted or unsubstituted alkylene group, carbonyl group, and combinations of these. $R^{23}$ to $R^{27}$ each independently represent a hydrogen atom or a substituent. Examples of the substituent include a nitro group, cyano group, hydroxy group, mercapto group, halogen atom, acetyl group, carbonyl group. substituted or unsubstituted allyl group, substituted or unsubstituted alkyl group (preferably an alkyl group having from 1 to 5 carbons), substituted or unsubstituted alkoxy group (preferably an alkoxy group having from 1 to 5 carbons), unsubstituted or substituted aryl group, unsubstituted or substituted aryloxy group, heterocyclic structure-containing group, group having a plurality of rings, combinations of these, and the like. Any one of $R^{23}$ to $R^{27}$ may be bonded to each other to form a cyclic structure. When any one of $R^{23}$ to $R^{27}$ are bonded to each other and form a cyclic structure, a structure in which a plurality of benzene rings are condensed, a structure in which a benzene ring and a heterocyclic ring, a non-aromatic ring, a ring to which a functional group such as a carbonyl group is bonded, and the like are condensed, or the like may be formed. Furthermore, the substituent of A and any one of $R^{23}$ to $R^{27}$ may be bonded to each other.

Examples of the aromatic group represented by Formula (VIII) above include nitrobenzyl groups, such as o-nitrobenzyl groups represented by Formula (IX-1) below, m-nitrobenzyl groups represented by Formula (IX-2) below, p-nitrobenzyl group represented by Formula (IX-3) below, benzyl groups represented by Formula (X) below, benzoyl groups represented by Formula (XI) below, and substituted groups of these. Nitrobenzyl groups are preferable, o-nitrobenzyl groups and p-nitrobenzyl groups are more preferable, and o-nitrobenzyl groups are particularly preferable. Furthermore, groups in the photofunctional group may be bonded to each other to form a cyclic structure.

[Chemical Formula 11]

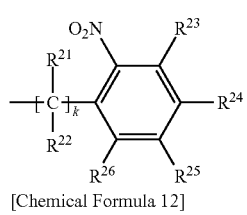

(IX-1)

[Chemical Formula 12]

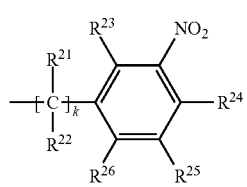

(IX-2)

[Chemical Formula 13]

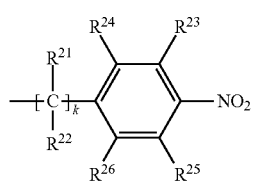

(IX-3)

In Formulas (IX-1) to (IX-3) above, $R^{23}$ to $R^{26}$ are the same as those described for Formula (VIII) above. $R^{21}$ and $R^{22}$ each independently represent a hydrogen atom, unsubstituted or substituted alkyl group having from 1 to 10 carbons, phenyl group, or substituted phenyl group. k is 1 or 2, and when k is 2, a plurality of the $R^{21}$ moieties and the $R^{22}$ moieties may be the same or different.

[Chemical Formula 14]

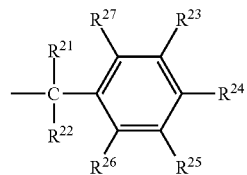

(X)

In Formula (X) above, $R^{23}$ to $R^{27}$ are the same as those described for Formula (VIII) above, and $R^{21}$ and $R^{22}$ are the same as those described for Formula (IX-1) above.

[Chemical Formula 15]

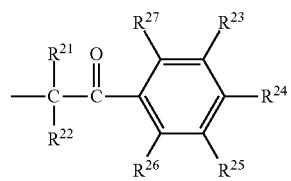

(XI)

In Formula (XI) above, $R^{23}$ to $R^{27}$ are the same as those described for Formula (VIII) above, and $R^{21}$ and $R^{22}$ are the same as those described for Formula (IX-1) above.

As the benzoyl group represented by Formula (XI) above, for example, benzoylphenylmethyl groups represented by Formula (XII) below are preferable.

[Chemical Formula 16]

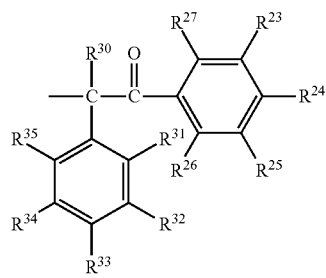

(XII)

In Formula (XII) above, $R^{23}$ to $R^{27}$ are the same as those described for Formula (VIII) above. $R^{30}$ represents a hydrogen atom, unsubstituted or substituted alkyl group having from 1 to 10 carbons, phenyl group, or substituted phenyl group. $R^{31}$ to $R^{35}$ each independently represent a hydrogen atom, nitro group, cyano group, hydroxy group, mercapto group, halogen atom, acetyl group, allyl group, alkyl group having from 1 to 5 carbons, alkoxy group having from 1 to 5 carbons, unsubstituted or substituted aryl group, or aryloxy group. $R^{31}$ to $R^{35}$ may be bonded to each other to form a double bond or an aromatic or non-aromatic ring, and may contain a hetero atom bond. $R^{23}$ to $R^{27}$ and $R^{31}$ to $R^{35}$ may be bonded to each other to form a cyclic structure and may contain a hetero atom bond.

Examples of the group having a heterocyclic structure include coumarin derivative groups represented by Formula (XIII) below, imide groups represented by Formula (XIV) below, substituted groups of these, and the like.

[Chemical Formula 17]

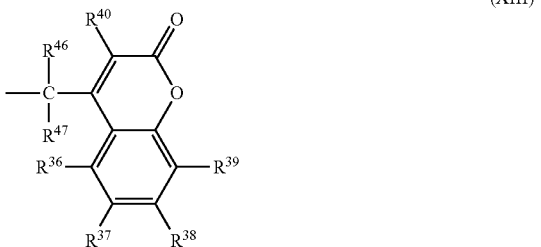

(XIII)

In Formula (XIII) above, $R^{46}$ and $R^{47}$ each independently represent a hydrogen atom or a substituent, and $R^{36}$ to $R^{40}$ each independently represent a hydrogen atom or a substituent. Examples of $R^{36}$ to $R^{40}$ include the same substances as those described for $R^{23}$ to $R^{27}$ of Formula (VIII) above, and two or more of $R^{36}$ to $R^{40}$ may be bonded to each other to form a cyclic structure. When any one of $R^{36}$ to $R^{40}$ are bonded to each other and form a cyclic structure, a structure in which a plurality of benzene rings are condensed, a structure in which a benzene ring and a heterocyclic ring, a non-aromatic ring, a ring to which a functional group such as a carbonyl group is bonded, and the like are condensed, or the like may be formed.

[Chemical Formula 18]

(XIV)

In Formula (XIV) above, $R^{48}$ and $R^{49}$ each independently represent a hydrogen atom, halogen atom, substituted or unsubstituted alkyl group, substituted or unsubstituted aryl group, cycloalkyl group, hydroxyl group, alkoxy group, carboxyl group, alkoxycarbonyl group, or acyl group, and $R^{48}$ and $R^{49}$ may be bonded to each other to form a double bond or an aromatic or non-aromatic ring. On $R^{48}$, $R^{49}$, or the double bond or the aromatic or non-aromatic ring formed by bonding $R^{48}$ and $R^{49}$, one or two imide groups represented by the Formula above may be further formed.

Examples of the —OQ group which is a photofunctional group Q being an o-nitrobenzyl group represented by Formula (IX-1) above include nitrobenzyloxy groups, such as a (2,6-dinitrobenzyl)oxy group, (2-nitrobenzyl)oxy group, (3-nitro-2-naphthalene)methyloxy group, (6,7-dimethoxy-3-nitro-2-naphthalenemethyl)oxy group, [1-(2,6-dinitrophenyl)ethyl]oxy group, [1-(2-nitrophenyl)ethyl]oxy group, [1-(3,5-dimethoxyphenyl-2-nitrobenzyl)-1-methylethyl]oxy group, (2,4-dinitrobenzyl)oxy group, (3,4,5-trimethoxy-2-nitrobenzyl)oxy group, (3,4-dimethoxy-2-nitrobenzyl)oxy group, (3-methyl-2-nitrobenzyl)oxy group, (3-methoxy-2-nitrobenzyl)oxy group, (4,5,6-trimethoxy-2-nitrobenzyl)oxy group, (4,5-dichloro-2-nitrobenzyl)oxy group, (4,5-dimethyl-2-nitrobenzyl)oxy group, (5-methyl-4-methoxy-2-nitrobenzyl)oxy group, (α-ethyl-2-nitrobenzyl)oxy group, and [α-2-nitrophenyl)-2-nitrobenzyl]oxy group.

Examples of the —OQ group which is a photofunctional group Q being a p-nitrobenzyl group represented by Formula (IX-3) above include nitrobenzyloxy groups, such as a (2,4-dinitrobenzyl)oxy group, (3,4-dinitrobenzyl)oxy group, (4-nitrobenzyl)oxy group, [1-(4-nitronaphthalene)methyl]oxy group, [1-(6,7-dimethoxy-4-nitronaphthalene)methyl]oxy group, [1-(2,4-dinitrophenyl)ethyl]oxy group, [1-(4-nitrophenyl)ethyl]oxy group, [1-(3,5-dimethoxyphenyl-4-nitrobenzyl)-1-methylethyl]oxy group, (2,3,5-trimethoxy-4-nitrobenzyl)oxy group, (2,3-dimethoxy-4-nitrobenzyl)oxy group, (3-methyl-4-nitrobenzyl)oxy group, (3-methoxy-4-nitrobenzyl)oxy group, (2,5,6-trimethoxy-4-nitrobenzyl)oxy group, (2,5-dichloro-4-nitrobenzyl)oxy group, (2,5-dimethyl-4-nitrobenzyl)oxy group, (5-methyl-2-methoxy-4-nitrobenzyl)oxy group, (α-ethyl-4-nitrobenzyl)oxy group, and [α-(4-nitrophenyl)-4-nitrobenzyl]oxy group.

Examples of the —OQ group which is a photofunctional group Q being a benzyl group represented by Formula (X) above include benzyloxy groups, such as a 3,5-dimethoxybenzyloxy group, [1-(3,5-dimethoxyphenyl)-1-methylethyl]oxy group, 9-anthrylmethyloxy group, 9-phenanthrylmethyloxy group, 1-pyrenylmethyloxy group, [1-(anthraquinon-2-yl)ethyl]oxy group, and 9-phenylxanthen-9-yloxy group.

Examples of the —OQ group which is a photofunctional group Q being a benzoylphenylmethyl group represented by Formula (XII) above include benzoin oxy aroups, such as a 1-(3,5-dimethoxybenzoyl)-1-(3,5-dimethoxyphenyl)methyloxy group, 1-hydroxy-1-phenylacetophenone oxy group, 1-benzoyl-1-phenylmethyloxy group, and 1-benzoyl-1-hydroxy-1-phenylethyloxy group.

Examples of the —OQ group which is a photofunctional group Q being a coumarin derivative group represented by Formula (XIII) above include coumarin-4-ylmethoxy aroups, such as a 7-methoxycoumarin-4-ylmethoxy group and 6-bromo-7-methoxycoumarin-4-ylmethoxy group.

Examples of the —OQ group which is a photofunctional group Q being an imide group represented by Formula (XIV) above include imidoxy groups, such as a phthalimidoxy group, succinimidoxy group, imidoxy succinate group, imidoxy maleate group, imidoxy hexahydrophthalate group, imidedioxy cyclohexanetetracarboxylate group, imidoxy tetrabromophthalate group, imidoxy tetrachlorophthalate group, imidoxy HET acid ester group, imidoxy himic acid ester group, imidoxy trimellitate group, imidedioxy pyromellitate group, and imidedioxy naphthalenetetracarboxylate group.

Examples of the —OQ group which is a photofunctional group Q being an oxime group represented by Formula (VII) above include oximeoxy groups, such as a N-(1-phenylethylidene)aminooxy group, diphenylmethylideneaminooxy group, di(4-methoxyphenyl)methylideneaminooxy group, N-(dimethylmethylidene)aminooxy group, N-(acetophenonemethylidene)aminooxy group, N-[1-(2-naphthyl)ethylidene[aminooxy group, N-(cyclohexylidene)aminooxy group, N-(fluorenylidene)aminooxy group, N-[di(nitrophenyl)methylidene]aminooxy group, N-(nitrofluorenylidene) aminooxy group, N-(dinitrofluorenylidene)aminooxy group, and N-(trinitrofluorenylidene)aminooxy group.

In Formulas (I) and (II) above, examples of the groups except ZQ group include aminocarbonyl groups, such as monoaminocarbonyl groups, such as a 3-(trimethoxysilyl)propyl aminocarbonyl group, 3-(triethoxysilyl)propyl aminocarbonyl group, 3-(triisopropoxysilyl)propyl aminocarbonyl group, 3-(methyldimethoxysilyl)propyl aminocarbonyl group, 3-(methyldiethoxysilyl)propyl aminocarbonyl group, N-[3-(trimethoxysilyl)-2-methylpropyl]-N-ethyl aminocarbonyl group, N-[3-(trimethoxysilyl)propyl]-N-phenyl aminocarbonyl group, N-[3-(trimethoxysilyl)propyl]-N-benzyl aminocarbonyl group, N-[3-(triethoxysilyl)propyl]-N-vinylbenzyl aminocarbonyl group, N-triethoxysilylmethyl-N-cyclohexyl aminocarbonyl group, N-(methyldiethoxysilyl)methyl-N-cyclohexyl aminocarbonyl group, and N-trimethoxysilylmethyl-N-phenyl aminocarbonyl group; diaminocarbonyl groups, such as a N-[3-(trimethoxysilyl)propyl]ethylene diaminocarbonyl group, N-[3-(methyldimethoxysilyl)propyl]ethylene diaminocarbonyl group, N-[3-(triethoxysilyl)propyl]ethylene diaminocarbonyl group, N-[3-(methyldiethoxysilyl)propyl]ethylene diaminocarbonyl group, N-[3-(triisopropoxysilyl)propyl]ethylene diaminocarbonyl group, N-[3-(trimethoxysilyl)propyl]-1,6-hexylene diaminocarbonyl group, N-(trimethoxysilylmethyl)ethylene diaminocarbonyl group, and N,N'-bis[3-(trimethoxysilyl)propyl]ethylene diaminocarbonyl group; triaminocarbonyl groups, such as a N-[3-(trimethoxysilyl)propyl]diethylene triaminocarbonyl group.

Among the aminocarbonyl groups, aminocarbonyl groups having an amino group (—NH$_2$) are preferable from the perspective of adhesive properties, and 3-(trimethoxysilyl)propyl aminocarbonyl group, 3-(triethoxysilyl)propyl aminocarbonyl group, 3-(methyldimethoxysilyl)propyl aminocarbonyl group, and N-[3-(trimethoxysilyl)propyl]ethylene diaminocarbonyl group are more preferable. From the perspectives of adhesive properties and curability, 3-(trimethoxysilyl)propyl aminocarbonyl group and 3-(triethoxysilyl)propyl aminocarbonyl group are most preferable.

In Formula (III) above, examples of the arylsulfonyl group include aromatic sulfonyl groups, such as a 2-naphthalenesulfonyl group and p-toluenesulfonyl group.

In Formula (III) above, examples of the groups except arylsulfonyl groups include monoamino groups, such as a 3-(trimethoxysilyl)propyl amino group, 3-(triethoxysilyl)propyl amino group, 3-(triisopropoxysilyl)propyl amino group, 3-(methyldimethoxysilyl)propyl amino group, 3-(methyldiethoxysilyl)propyl amino group, N-[3-(trimethoxysilyl)-2-methylpropyl]-N-ethyl amino group, N-[3-(trimethoxysilyl)propyl]-N-phenyl amino group, N-[3-(trimethoxysilyl)propyl]-N-benzyl amino group, N-[3-(triethoxysilyl)propyl]-N-vinylbenzyl amino group, N-triethoxysilylmethyl-N-cyclohexyl amino group, N-(methyldiethoxysilyl)methyl-N-cyclohexyl amino group, and N-trimethoxysilylmethyl-N-phenyl amino group; diamino groups, such as a N-[3-(trimethoxysilyl)propyl] ethylene diamino group, N-[3-(methyldimethoxysilyl)propyl]ethylene diamino group, N-[3-(triethoxysilyl)propyl] ethylene diamino group, N-[3-(methyldiethoxysilyl)propyl] ethylene diamino group, N-[3-(triisopropoxysilyl)propyl] ethylene diamino group, N-[3-(trimethoxysilyl)propyl]-1,6-hexylene diamino group, N-(trimethoxysilylmethyl) ethylene diamino group, and N,N'-bis[3-(trimethoxysilyl)propyl]ethylene diamino group; and triamino groups, such as N-[3-(trimethoxysilyl)propyl]diethylene triamino group, In Formula (IV) above, examples of the groups except aryl oxime groups include carbonyl groups, such as a 3-(trimethoxysilyl)propylcarbonyl group, 3-(triethoxysilyl)propylcarbonyl group, 3-(triisopropoxysilyl)propylcarbonyl group, 3-(methyldimethoxysilyl)propylcarbonyl group, and 3-(methyldiethoxysilyl)propylcarbonyl group.

In Formula (V) above, examples of trans-o-coumaric acid derivative group include trans-o-coumaric acid groups, such as an (E)-2-(2-hydroxyphenyl)ethenyl group, (E)-2-(2-hydroxyphenyl)-1-propenyl group, (E)-2-(2-hydroxyphenyl)-1-propenyl group, (E)-2-(2-hydroxyphenyl)-2-phenylethenyl group, (E)-2-(2-hydroxy-4,5-methylenedioxyphenyl) ethenyl group, (E)-2-(2-hydroxy-4,5-dimethoxyphenyl)-1-propenyl group, (E)-2-(2-hydroxy-5-nitrophenyl)-1-propenyl group, and (E)-2-(1-hydroxy-2-anthryl)-1-propenyl group.

The compounded proportion of the crosslinkable silicon group-containing compound (B) is not particularly limited; however, the compounded proportion is preferably from 0.01 to 50.00 parts by mass, more preferably from 1.00 to 20.00 parts by mass, and even more preferably from 3.00 to 10.00 parts by mass, per 100 parts by mass of the crosslinkable silicon group-containing organic polymer (A). These crosslinkable silicon group-containing compound may be used alone, or two or more types of these may be used in combination.

The photocurable composition of the present invention preferably further comprises (C) a silicon compound having a Si—F bond. By allowing the silicon compound having a Si—F bond to be included in the photocurable composition of the present invention, curing can be further promoted.

In the present invention, the silicon compound having a Si—F bond (C) acts as a curing catalyst of the crosslinkable silicon group-containing organic polymer (A). The silicon compound having a Si—F bond (C) is not particularly limited, and, as the silicon compound having a Si—F bond (C), a wide variety of publicly known compounds containing a silicon group having a Si—F bond (hereinafter, also referred to as "fluorosilyl group") can be used, and any of low molecular compounds or high molecular compounds can be used. However, the silicon compound having a Si—F bond (C) is preferably an organosilicon compound having a fluorosilyl group, and more preferably an organic polymer having a fluorosilyl group from the perspective of high level of safety. Furthermore, since the viscosity of the blended materials becomes low, a low molecular organosilicon compound having a fluorosilyl group is preferable.

Preferable specific examples of the silicon compound having a Si—F bond (C) include compounds that are represented by Formula (8) below and that have a fluorosilyl group, such as fluorosilanes represented by Formula (7) below (in the present specification, also referred to as "fluorinated compound"), organic polymer having a fluorosilyl group (in the present specification, also referred to as "fluorinated polymer"), and the like.

$$R^{50}_{4-d}SiF_d \qquad (7)$$

(In Formula (7), the $R^{50}$ moieties each independently represent a substituted or unsubstituted hydrocarbon group having from 1 to 20 carbons, or an organosiloxy group represented by $R^{80}SiO$— (the $R^{80}$ moieties each independently represent a substituted or unsubstituted hydrocarbon group having from 1 to 20 carbons, or a fluorine atom). d is any one of 1 to 3, and d is preferably 3. When a plurality of the $R^{50}$ moieties and the $R^{80}$ moieties exists, these may be the same or different.)

$$—SiF_d R^{50}_e X'_f \qquad (8)$$

(In Formula (8), $R^{50}$ and d are the same as $R^{50}$ and d of Formula (7), respectively. The X' moieties each independently represent a hydroxy group or a hydrolyzable group except fluorine. e is any one of 0 to 2, f is any one of 0 to 2, and d+e+f is 3. When a plurality of the $R^{50}$ moieties and the X' moieties exists, these may be the same or different.)

As the fluorosilanes represented by Formula (7) above, publicly known fluorosilanes that are represented by Formula (7) are exemplified. Although the fluorosilanes are not particularly limited, examples thereof include fluorotrimethylsilane, fluorotriethylsilane, fluorotripropylsilane, fluorotributylsilane, fluorodimethylvinylsilane, fluorodimethylphenylsilane, fluorodimethylbenzylsilane, fluorodimethyl(3-methylphenyl)silane, fluorodimethyl(4-methylphenyl)silane, fluorodimethyl(4-chlorophenyl)silane, fluorotriphenylsilane, difluorodimethylsilane, difluorodiethylsilane, difluorodibutylsilane, difluoromethylphenylsilane, difluorodiphenylsilane, trifluoroethylsilane, trifluoropropylsilane, trifluorobutylsilane, trifluorophenylsilane, γ-glycidoxypropyltrifluorosilane, γ-glycidoxypropyldifluoromethylsilane, vinyltrifluorosilane, vinyldifluoromethylsilane, γ-methacryloxypropylfluorodimethylsilane, γ-methacryloxypropyldifluoromethylsilane, γ-methacryloxypropyltrifluorosilane, 3-mercaptopropyltrifluorosilane, octadecylfluorodimethylsilane, octadecyldifluoromethylsilane, octadecyltrifluorosilane, 1,3-difluoro-1,1,3,3-tetramethyldisiloxane, 1,3,5,7-tetrafluoro-1,3,5,7-tetrasilatricyclo[3.3.1.1(3,7)]decane, 1,1-difluoro-1-silacyclo-3-pentene, fluorotris(trimethylsiloxy)silane, and the like.

Among these, from the perspectives of ease in obtaining raw materials, ease in synthesis, and the like, fluorodimethylvinylsilane, fluorodimethylphenylsilane, fluorodimethylbenzylsilane, vinyltrifluorosilane, vinyldifluoromethylsilane, γ-methacryloxypropylfluorodimethylsilane, γ-methacryloxypropyldifluoromethylsilane, γ-methacryloxypropyltrifluorosilane, 3-mercaptopropyltrifluorosilane, octadecylfluorodimethylsilane, octadecyldifluoromethylsilane, octadecyltrifluorosilane, 1,3-difluoro-1,1,3,3-tetramethyldisiloxane, and the like are preferable.

In the compound having a fluorosilyl group represented by Formula (8) above, the hydrolyzable group represented by X' in Formula (8) is exemplified by the same groups as the hydrolyzable group of X in Formula (1); specific examples thereof include a hydrogen atom, halogen atoms except fluorine, alkoxy groups, acyloxy groups, ketoximate groups, amino groups, amide groups, acid amide groups, aminooxy groups, mercapto groups, alkenyloxy groups, and the like. Among these, a hydrogen atom, alkoxy groups, acyloxy groups, ketoximate groups, amino groups, amide groups, aminooxy groups, mercapto groups, and alkenyloxy groups are preferable, and alkoxy groups are particularly preferable from the perspective of moderate hydrolyzability and easy handling.

Examples of $R^{50}$ in Formula (8) above include alkyl groups such as a methyl group and ethyl group, cycloalkyl groups such as a cyclohexyl group, aryl groups such as a phenyl group, aralkyl groups such as a benzyl group, a triorganosiloxy group represented by $R^{80}SiO$—, in which $R^{80}$ is a methyl group, phenyl group, or the like, and the like. Among these, a methyl group is particularly preferable.

As specific examples of the fluorosilyl group represented by Formula (8) above, examples of the silicon group having no hydrolyzable group other than the fluorine include the silicon groups in which substitution with one fluorine atom occurred on a silicon group, such as a fluorodimethylsilyl group, fluorodiethylsilyl group, fluorodipropylsilyl group, fluorodiphenylsilyl group, and fluorodibenzylsilyl group; the silicon groups in which substitution with two fluorine atoms occurred on a silicon group, such as a difluoromethylsilyl group, difluoroethylsilyl group, difluorophenylsilyl group, and difluorobenzylsilyl group; and the silicon groups in which substitution with three fluorine atoms occurred on a silicon group, which is a trifluorosilyl group; and examples of the silicon group having both fluorine and another hydrolyzable group include a fluoromethoxymethylsilyl group, fluoroethoxymethylsilyl group, fluoromethoxyethylsilyl group, fluoromethoxyphenylsilyl group, fluorodimethoxysilyl group, fluorodiethoxysilyl group, fluorodipropoxysilyl group, fluorodiphenoxysilyl group, fluorobis(2-propenoxy)silyl group, difluoromethoxysilyl group, difluoroethoxysilyl group, difluorophenoxysilyl group, fluorodichlorosilyl group, difluorochlorosilyl group, and the like. The silicon groups having no hydrolyzable group other than the fluorine, and the fluorosilyl groups in which $R^{50}$ is a methyl group are preferable, and the trifluorosilyl group is more preferable.

Furthermore, from the perspective of ease in synthesis, a fluorodimethylsilyl group, difluoromethylsilyl group, trifluorosilyl group, fluoromethoxymethylsilyl group, fluoroethoxymethylsilyl group, fluoromethoxyethylsilyl group, fluorodimethoxysilyl group, fluorodiethoxysilyl group, difluoromethoxysilyl group, and difluoroethoxysilyl group are more preferable. From the perspective of stability, the silicon group having no hydrolyzable group other than the fluorine, such as a fluorodimethylsilyl group, difluoromethylsilyl group, and trifluorosilyl group are even more preferable. From the perspective of high curability, the silicon group in which substitution with two or three fluorine atoms occurred on a silicon group, such as a difluoromethylsilyl group, difluoromethoxysilyl group, difluoroethoxysilyl group, and trifluorosilyl group are preferable, and a trifluorosilyl group is most preferable.

The compound having a fluorosilyl group represented by Formula (8) above is not particularly limited, and any single molecule compounds or high molecular compounds can be used. Examples thereof include inorganic silicon compounds, such as tetrafluorosilane and octafluorotrisilane; low molecular organosilicon compounds, such as fluorosilanes represented by Formula (7) above, fluorotrimethoxysilane, difluorodimethoxysilane, trifluoromethoxysilane, fluorotriethoxysilane, difluorodiethoxysilane, trifluoroethoxysilane, methylfluorodimethoxysilane, methyldifluoromethoxysilane, methyltrifluorosilane, methylfluorodiethoxysilane, methyldifluoroethoxysilane, vinylfluorodimethoxysilane, vinyldifluoromethoxysilane, vinyltrifluorosilane, vinylfluorodiethoxysilane, vinyldifluoroethoxysilane, phenylfluorodimethoxysilane, phenyldifluoromethoxysilane, phenyltrifluorosilane, phenylfluorodiethoxysilane, phenyldifluoroethoxysilane, and fluorotrimethylsilane; and high molecular compounds, such as fluorinated polysiloxane having a fluorosilyl group represented by Formula (8) on its terminal. Fluorosilanes represented by Formula (7) above and polymers having a fluorosilyl group represented by Formula (8) on its terminal of the main chain or a side chain are preferable.

The fluorosilanes represented by Formula (7) above and compounds having a fluorosilyl group represented by Formula (8) above may be commercially available reagents, or may be synthesized from raw material compounds. The synthesizing method is not particularly limited; however, a compound obtained by reacting a compound having a hydrolyzable silicon group represented by Formula (9) below with a fluorinating agent using a publicly known method (e.g. Ishikawa et al., Organometallics, 1996, 15, p. 2478, and the like) can be suitably used.

(9)

(In Formula (9), $R^{50}$ and X' are the same as $R^{50}$ and X' of Formula (8), respectively, and q is any one of 1 to 3.)

Examples of the hydrolyzable silicon group represented by Formula (9) above include alkoxysilyl groups, siloxane bonds, halosilyl groups, such as a chlorosilyl group, hydrosilyl groups, and the like.

Specific examples of the fluorinating agent used in the fluorination of an alkoxysilyl group are not particularly limited, and include $NH_4F$, $Bu_4NF$, HF, $BF_3$, $Et_2NSF_3$, $HSO_3F$, $SbF_5$, $VOF_3$, $CF_3CHFCF_2NEt_2$), and the like.

Specific examples of the fluorinating agent used in the fluorination of a halosilyl group are not particularly limited, and include $AgBF_4$, $SbF_3$, $ZnF_2$, NaF, KF, CsF, $NH_4F$, $CuF_2$, $NaSiF_6$, $NaPF_6$, $NaSbF_6$, $NaBF_4$, $Me_3SnF$, $KF(HF)_{1.5\text{-}5}$, and the like.

Specific examples of the fluorinating agent used in the fluorination of a hydrosilyl group are not particularly limited, and include AgF, $PF_5$, $Ph_3CBF_4$, $SbF_3$, $NOBF_4$, $NO_{27}BF_4$, and the like.

The compound having a siloxane bond is cleaved by $BF_3$ or the like to obtain a fluorosilyl group.

Among the methods of synthesizing fluorosilyl groups using these fluorinating agents, from the perspectives of simple reaction, high reaction efficiency, and high level of safety, a method of fluorinating alkoxysilane using $BF_3$ and a method of fluorinating chlorosilane using $CuF_2$ or $ZnF_2$ are preferable.

As $BF_3$, a $BF_3$ gas, $BF_3$ ether complex, $BF_3$ thioether complex, $BF_3$ amine complex, $BF_3$ alcohol complex, $BF_3$ carboxylic acid complex, $BF_3$ phosphoric acid complex, $BF_3$ hydrate, $BF_3$ piperidine complex, $BF_3$ phenol complex, and the like can be used; however, from the perspective of easy handling or the like, a $BF_3$ ether complex, $BF_3$ thioether complex, $BF_3$ amine complex, $BF_3$ alcohol complex, $BF_3$ carboxylic acid complex, and $BF_3$ hydrate are preferable. Among these, a $BF_3$ ether complex, $BF_3$ alcohol complex, $BF_3$ hydrate are preferable due to high reactivity, and a $BF_3$ ether complex is particularly preferable.

The organic polymer having the fluorosilyl group (in the present specification, also referred to as "fluorinated polymer") is not particularly limited as long as the organic polymer having a fluorosilyl group is an organic polymer having a Si—F bond, and a wide variety of publicly known organic polymers having a Si—F bond can be used.

The position of the SiF bond in the organic polymer is not particularly limited, and effect can be exhibited regardless of the position, within the polymer molecule, of the SiF bond. When the SiF bond is positioned at a terminal of the main chain or a side chain, the bond is expressed as —$SiR''_2F$, and when the SiF bond is positioned within the main chain of the polymer, the bond is expressed as —SiR″F— or =SiF (the R″ moieties each independently represent any group).

As the organic polymer having a Si—F bond at a terminal of the main chain or a side chain, polymers having a fluorosilyl group represented by Formula (8) above is preferable. Examples of the organic polymer in which a fluorosilyl group is positioned within the main chain of the polymer include —$Si(CH_3)F$—, —$Si(C_6H_5)F$—, —$SiF_2$—, =SiF, and the like.

The fluorinated polymer may be a single type of polymers in which the type of the fluorosilyl groups and the main chain backbones are the same (i.e. the single type of polymers having the same number of fluorosilyl groups per one molecule, the same bonding positions thereof, the same number of F contained in the fluorosilyl groups, and the same main chain backbone) or may be a mixture of a plurality of polymers in which some or all of these conditions are different. In both the case where the fluorinated polymer is a single type of polymers and the case where the fluorinated polymer is a mixture of a plurality of polymers, the fluorinated polymer can be suitably used as a resin component of a curable composition exhibiting rapid curability; however, to obtain a rubber-like cured product exhibiting a high curability, high strength, high elongation, and low elastic modulus, the amount of the fluorosilyl group contained in the fluorinated polymer is, on average, at least one, preferably from 1.1 to 5, and more preferably from 1.2 to 3, per one molecule of the polymer. When the number of the fluorosilyl group contained in one molecule is less than 1 group on average, curability becomes insufficient, and exhibition of suitable elastic behavior of the rubber may become difficult. Furthermore, when the number of the fluorosilyl group contained in one molecule is greater than 5 groups on average, elongation of the rubber-like cured product may become small. Note that, as described above, the fluorosilyl group may be present at a terminal of the main chain or at a terminal of a side chain of the polymer molecular chain, or may be present within the main chain; however, particularly when the fluorosilyl group is present at a terminal of the main chain, a rubber-like cured product exhibiting a high strength, high elongation, and low elastic modulus tends to be easily obtained since the effective network length of the organic polymer component contained in the cured product that is formed finally is longer. When two or more fluorosilyl groups are present in one molecule, the silicon groups may be the same or different to each other.

Furthermore, the fluorinated polymer may contain, together with a fluorosilyl group, a substituent other than a fluorosilyl group, such as a silicon group having only a hydrolyzable group other than fluorine (e.g. methyldimethoxysilyl group, and the like) as a hydrolyzable group. An example of such a fluorinated polymer is a polymer in which one of the main chain terminal is a fluorosilyl group and the other main chain terminal is a silicon group having only a hydrolyzable group other than fluorine as a hydrolyzable group.

For the fluorinated polymer, introduction of the fluorosilyl group may be performed by any methods; however, an introducing method by reacting a low molecular silicon compound having a fluorosilyl group with a polymer (method (i)), and a method of modifying a silicon group of a polymer containing a reactive silicon group having a hydrolyzable group other than fluorine (hereinafter, also referred to as "polymer (X)") to a fluorosilyl group (method (ii)) are exemplified.

As a specific example of the method (i), the following method is exemplified.

(1) A method in which a polymer having a hydroxy group and a functional group, such as an epoxy group and isocyanate group, in a molecule is reacted with a compound having a functional group that is reactive to the functional group of the polymer and a fluorosilyl group. Examples thereof include a method in which a polymer having a hydroxy group at a terminal is reacted with isocyanatepropyldifluoromethylsilane, and a method in which a polymer having a SiOH group at a terminal with difluorodiethoxysilane.

(II) A method in which hydrosilane having a fluorosilyl group is applied to a polymer having an unsaturated group in a molecule to perform hydrosilylation. Examples thereof include a method in which a polymer having an allyl group at a terminal is reacted with difluoromethylhydrosilane.

(III) A method in which a polymer having an unsaturated group is reacted with a compound having a mercapto group and a fluorosilyl group. Examples thereof include a method in which a polymer having an allyl group at a terminal is reacted with mercaptopropyldifluoromethylsilane.

As the polymer containing a reactive silicon group having a hydrolyzable group other than fluorine (polymer (X)) used in the method (ii) above, the crosslinkable silicon group-containing organic polymer (A) described above can be suitably used.

Furthermore, in the method (ii), publicly known methods can be used as the method of converting a reactive silicon group having a hydrolyzable group other than fluorine into a fluorosilyl group, and an example is a method in which the hydrolyzable silicon group represented by Formula (9) described above is converted into a fluorosilyl group using a fluorinating agent.

Examples of the fluorinating agent include the fluorinating agents described above. Among these, $BF_3$ ether complexes, $BF_3$ alcohol complexes, and $BF_3$ dihydrates are more preferable from the perspectives of achieving a high activity, proceeding fluorination efficiently, causing no salts or the like in byproducts, and making post-treatment easy. $BF_3$ ether complexes are particularly preferable.

Furthermore, although the fluorination reaction by a $BF_3$ ether complex proceeds without heating, heating is preferably performed to proceed the fluorination more efficiently. The heating temperature is preferably 50° C. or higher and 150° C. or lower, and more preferably 60° C. or higher and 130° C. or lower. When the heating temperature is 50° C. or lower, the reaction does not proceed efficiently, and the fluorination may take time. When the heating temperature is 150° C. or higher, the fluorinated polymer may be decomposed. In the fluorination using a $BF_3$ complex, coloration may occur depending on the type of the used polymer (X). From the perspective of suppressing the coloration, a $BF_3$ alcohol complex or $BF_3$ dihydrate is preferably used.

The fluorinating agent used in the production of the fluorinated polymer may act as a curing catalyst of the fluorinated polymer, and thus, if water is present when the fluorinated polymer is produced using the method (ii) above, a silanol condensation reaction may proceed, whereby the viscosity of the obtained fluorinated polymer may be increased. Therefore, the production of the fluorinated polymer is preferably performed in the environment where the moisture content is as little as possible, and the polymer (X) to be fluorinated is preferably subjected to a dehydration process such as azeotropic dehydration using toluene, hexane, or the like before the fluorination. However, when a $BF_3$ amine complex is used, it is difficult to proceed the fluorination after the dehydration operation and the reactivity tends to be enhanced by adding a little amount of water, and thus water is preferably added at an amount that causes an acceptable degree of viscosity increase. Furthermore, from the perspective of stability of the fluorinated polymer, the fluorinating agent and byproduct components derived from the fluorinating agent are preferably removed by filtration, decantation, liquid separation, devolatilization under reduced pressure, or the like, after the fluorination. When the fluorinated polymer is produced using a $BF_3$-based fluorinating agent described above, the amount of the remaining $BF_3$ and $BF_3$-derived components produced by the reaction in the produced fluorinated polymer is such that the amount of B is preferably less than 500 ppm, more preferably less than 100 ppm, and particularly preferably less than 50 ppm. By removing $BF_3$ and the $BF_3$-derived components, increase in the viscosity of the obtained fluorinated polymer and the mixture of the fluorinated polymer with the polymer (X) can be suppressed. Taking this into consideration, the fluorination method using a $BF_3$ ether complex or $BF_3$ alcohol complex is preferable since the boron components can be relatively easily removed by vacuum devolatilization, and a method using a $BF_3$ ether complex is particularly preferable.

When the polymer (X) has two or more hydrolyzable groups other than fluorine, all hydrolyzable groups may be fluorinated, or these hydrolyzable groups may be partially fluorinated by adjusting the fluorinating conditions by a method such as reducing the amount of the fluorinating agent. For example, when the fluorinated polymer is produced using the polymer (X) in the method (ii), the amount of the fluorinating agent used is not particularly limited, and it is acceptable that the molar quantity of the fluorine atom in the fluorinating agent is not less than the equimolar quantity with respect to the molar quantity of the polymer (X). When fluorination of all the hydrolyzable groups contained in the polymer (X) is intended by the method (ii), the fluorinating agent is used preferably at an amount such that the molar quantity of the fluorine atom in the fluorinating agent is not less than the equimolar quantity with respect to total molar quantity of the hydrolyzable group in the reactive silicon group contained in the polymer (X). Note that "fluorine atom in the fluorinating agent" refers to a fluorine atom which can substitute for the fluorine atom effective in fluorination in the fluorinating agent, that is, the hydrolyzable group in the reactive silicon group of the polymer (X).

The low molecular compound having a fluorosilyl group in the method (i) above can also be synthesized from a general-purpose reactive silicon group-containing low molecular compound using the fluorination method described above.

Since, in the method (i), a reactive group for reacting the polymer with the silicon group-containing low molecular compound exists together with a fluorosilyl group, the fluorinated polymer is preferably obtained by the method (ii) in the case where the reaction becomes complicated.

The glass transition temperature of the fluorinated polymer is not particularly limited; however, the glass transition temperature is preferably 20° C. or lower, more preferably 0° C. or lower, and particularly preferably −20° C. or lower. When the glass transition temperature is higher than 20° C., viscosity may be increased during winter season or in cold region, thereby leading to difficulties in handling, and the flexibility of the cured product, which is obtained when the fluorinated polymer is used as a curable composition, may be lowered, and thus elongation may be decreased. The glass transition temperature can be determined by DSC measurement.

The fluorinated polymer may be straight or branched. The number average molecular weight of the fluorinated polymer, in terms of polystyrene, by GPC is preferably from 3,000 to 100,000, more preferably from 3,000 to 50,000, and particularly preferably from 3,000 to 30,000. When the number average molecular weight is less than 3,000, inconvenience tends to occur in elongation characteristics of the cured product. When the number average molecular weight is greater than 100,000, undesirable tendencies may manifest in workability due to its high viscosity.

The compounded proportion of the silicon compound having a Si—F bond (C) is not particularly limited; however, when a high molecular compound having the number average molecular weight of 3,000 or greater, such as a fluorinated polymer, is used, the compounded proportion is preferably from 0.2 to 80 parts by mass, more preferably from 0.3 to 30 parts by mass, and even more preferably from 0.5 to 20 parts by mass, per 100 parts by mass of the crosslinkable silicon group-containing organic polymer (A). When a low molecular compound having a fluorosilyl group and a number average molecular weight of less than 3,000 (e.g.

fluorosilanes represented by Formula (7) above, low molecular organosilicon compounds having a fluorosilyl group represented by Formula (8), inorganic silicon compounds having a fluorosilyl group, and the like) is used, the compounded proportion is preferably from 0.01 to 10 parts by mass, and more preferably from 0.05 to 5 parts by mass, per 100 parts by mass of the crosslinkable silicon group-containing organic polymer (A).

The photocurable composition of the present invention preferably further contains a photobase generator (D) besides the crosslinkable silicon group-containing compound (B). In the present invention, the photobase generator (D) acts as a curing catalyst of the crosslinkable silicon group-containing organic polymer (A) when irradiated with light. The photobase generator (D) is not particularly limited as long as it is a substance that generates a base by action of active energy rays, such as ultraviolet rays, electron beams, X-rays, infrared rays, and visible rays; and publicly known photobase generators, such as (1) salts of an organic acid and a base which decarboxylate and decompose due to irradiation of active energy rays, such as ultraviolet rays, visible rays, and infrared rays, (2) compounds that release amines by decomposition caused by an intramolecular nucleophilic substitution reaction, rearrangement reaction, or the like, and (3) substances that release a base by some sort of chemical reaction caused by irradiation of energy rays, such as ultraviolet rays, visible rays, and infrared rays, can be used.

The base generated from the photobase generator (D) is not particularly limited; however, organic bases, such as amine compounds, are preferable. Examples thereof include primary alkylamines, such as ethylamine, propylamine, octylamine, cyclohexylamine, and 1,5-diaminopentane; primary aromatic amines, such as N-methylbenzylamine and 4,4'-methylenedianiline; secondary alkylamines, such as diethylamine; amines having a secondary amino group and tertiary amino group, such as imidazole; tertiary alkylamines, such as trimethylamine, triethylamine, tributylamine, and 1,8-diazabicyclo[2.2.2]octane (DABCO); tertiary heterocyclic amines, such as 4-isopropylmorpholine; tertiary aromatic amines, such as 4-dimethylaminopyridine and N,N-dimethyl(3-phenoxy-2-hydroxypropyl)amine; amidines, such as 1,8-diazabicyclo[5.4.0]undecene-7 (DBU) and 1,5-diazabicyclo[4.5.0]nonene-5 (DBN); and phosphazene derivatives, such as tris(dimethylamino)(methylimino) phosphorane described in Japanese Unexamined Patent Application Publication No. 2011-80032A or the like Amine compounds having a tertiary amino group are preferable, and amidines and phosphazene derivatives, which are strong bases, are more preferable. As amidines, although any of acyclic amidines and cyclic amidines can be used, cyclic amidines are more preferable.

These bases may be used alone, or two or more types of these may be used in combination.

Examples of the acyclic amidines include guanidine-based compounds, biguanide-based compounds, and the like.

Examples of guanidine-based compound include guanidine, 1,1,3,3-tetramethylguanidine, 1-butylguanidine, 1-phenylguanidine, 1-o-tolylguanidine, 1,3-diphenylguanidine, and the like.

Examples of biguanide-based compound include butylbiguanide, 1-o-tolylguanidine, and 1-phenylbiguanide.

Furthermore, use of a photobase generator that generates, among acyclic amidine compounds, aryl-substituted guanidine-based compound or aryl-substituted biguanide-based compounds, such as phenylguanidine, 1-o-tolylguanidine, 1-phenylbiguanide, and the like is preferable from the perspectives of exhibiting tendency to enhance surface curability and exhibiting tendency to enhance adhesive properties of the obtained cured product when such a photobase generator is used as a catalyst for polymer (A).

Examples of the cyclic amidine include cyclic guanidine-based compounds, imidazoline-based compounds, imidazole-based compounds, tetrahydropyrimidine-based compounds, triazabicycloalkene-based compounds, and diazabicycloalkene-based compounds.

Examples of the cyclic guanidine-based compound include cyclic guanidine-based compounds, including those described in Japanese Unexamined Patent Application Publication No. 2011-80032A, such as 1,5,7-triaza-bicyclo [4.4.0]dec-5-ene, 7-methyl-1,5,7-triaza-bicyclo[4.4.0]dec-5-ene, 7-ethyl-1,5,7-triaza-bicyclo[4.4.0]dec-5-ene, 7-isopropyl-1,5,7-triaza-bicyclo[4.4.0]dec-5-ene, and the like.

Examples of the imidazoline-based compound include ethylimidazoline, 1,2-dimethylimidazoline, 1-methyl-2-ethylimidazoline, 1-methyl-2-octylimidazoline, and the like.

Examples of the imidazole-based compound include imidazole, 2-ethyl-4-methyl imidazole, and the like.

Examples of the tetrahydropyrimidine-based compound include 1-methyl-1,4,5,6-tetrahydropyrimidine, 1,2-dimethyl-1,4,5,6-tetrahydropyrimidine, 1-methyl-2-ethyl-1,4,5,6-tetrahydropyrimidine, 1-methyl-2-butyl-1,4,5,6-tetrahydropyrimidine, 1-ethyl-2-octyl-1,4,5,6-tetrahydropyrimidine, and the like.

Examples of the triazabicycloalkene-based compound include 7-methyl-1,5,7-triazabicyclo[4.4.0]decene-5,7-ethyl-1,5,7-triazabicyclo[4.4.0]decene-5, and the like.

Examples of the diazabicycloalkene-based compound include 1,5-diazabicyclo[4.2.0]octene-5,1,8-diazabicyclo [7.2.0]undecene-8,1,4-diazabicyclo[3.3.0]octene-4,3-methyl-1,4-diazabicyclo[3.3.0]octene-4,3,6,7,7-tetramethyl-1,4-diazabicyclo[3.3.0]octene-4,7,8,8-trimethyl-[1,5-diazabicyclo[4.3.0]nonene-5,1,8-diazabicyclo[7.3.0] dodecene-8,1,7-diazabicyclo[4.3.0]nonene-6,8-phenyl-1,7-diazabicyclo[4.3.0]nonene-6,1,5-diazabicyclo[4.3.0] nonene-5,1,5-diazabicyclo[4.4.0]decene-5,4-phenyl-1,5-diazabicyclo[4.4.0]decene-5,1,8-diazabicyclo[5.3.0]decene-7,1,8-diazabicyclo[7.4.0]tridecene-8,1,8-diazabicyclo [5.4.0]undecene-7,6-methylbutylamino-1,8-diazabicyclo [5.4.0]undecene-7,6-methyloctylamino-1,8-diazabicyclo [5.4.0]undecene-7,6-dibutylamino-1,8-diazabicyclo[5.4.0] undecene-7,6-butylbenzylamino-1,8-diazabicyclo[5.4.0] undecene-7,6-dihexylamino-1,8-diazabicyclo[5.4.0] undecene-7,9-methyl-1,8-diazabicyclo[5.4.0]undecene-7,9-methyl-1,8-diazabicyclo[5.3.0]decene-7,1,6-diazabicyclo [5.5.0]dodecene-6,1,7-diazabicyclo[6.5.0]tridecene-7,1,8-diazabicyclo[7.5.0]tetradecene-8,1,10-diazabicyclo[7.3.0] dodecene-9,1,10-diazabicyclo[7.4.0]tridecene-9,1,14-diazabicyclo[11.3.0]hexadecene-13,1,14-diazabicyclo [11.4.0]heptadecene-13, and the like.

Among the cyclic amidines, from the perspectives of being readily available industrially and exhibiting a high catalytic activity due to the pKa value of the conjugate acid being 12 or higher, 1,8-diazabicyclo[5.4.0]undecene-7 (DBU) and 1,5-diazabicyclo[4.3.0]nonene-5 (DBN) are particularly preferable.

As the photobase generator (D) used in the present invention, publicly known photobase generators except the crosslinkable silicon group-containing compound (B) can be used; however, photo-latent amine compounds that generate an amine compound by action of active energy rays are preferable. As the photo-latent amine compound, any of photo-latent primary amines that generate an amine compound having a primary amino group by action of active energy rays, photo-latent secondary amines that generate an amine compound having a secondary amino group by action of active energy rays, or photo-latent tertiary amines that generate an amine compound having a tertiary amino group by action of active energy rays can be used; however, since the generated base exhibits a high catalytic activity, photo-latent tertiary amines are more preferable.

Examples of the photo-latent primary amine and photo-latent secondary amine include orthonitrobenzyl urethane-based compounds, such as 1,3-bis[N-(2-nitrobenzyloxycarbonyl)-4-piperidyl]propane, N-{[(3-nitro-2-naphthalenemethyl)oxy]carbonyl}-2,6-dimethylpiperidine, N-{[(6,7-dimethoxy-3-nitro-2-naphthalenemethyl)oxy]carbonyl}-2,6-dimethylpiperidine, N-(2-nitrobenzyloxycarbonyl)piperidine, [[(2,6-dinitrobenzyl)oxy]carbonyl]cyclohexylamine, N,N'-bis(2-nitrobenzyloxycarbonyl)hexyldiamine, o-nitrobenzyl N-cyclohexylcarbamate, 2-nitrobenzyl cyclohexylcarbamate, 1-(2-nitrophenyl)ethyl cyclohexylcarbamate, 2,6-dinitrobenzyl cyclohexylcarbamate, 1-(2,6-dinitrophenyl)ethyl cyclohexylcarbamate, 1-(3,5-dimethoxyphenyl)-1-methylethyl cyclohexylcarbamate, bis[[(2-nitrobenzyl)oxy]carbonyl]hexane-1,6-diamine, and N-(2-nitrobenzyloxycarbonyl)pyrrolidine; dimethoxybenzyl urethane-based compounds, such as α,α-dimethyl-3,5-dimethoxybenzyl cyclohexylcarbamate and 3,5-dimethoxybenzyl cyclohexylcarbamate; benzoin carbamates, such as 1-(3,5-dimethoxybenzoyl)-1-(3,5-dimethoxyphenyl)methyl cyclohexylcarbamate, 2-hydroxy-2-phenylacetophenone cyclohexylcarbamate, dibenzoin isophorone dicarbamate, 1-benzoyl-1-phenylmethyl cyclohexylcarbamate, and 2-benzoyl-2-hydroxy-2-phenylethyl cyclohexylcarbamate; o-acyloximes, such as o-benzylcarbonyl-N-(1-phenylethylidene)hydroxylamine; o-carbamoyloximes, such as [(pentane-1,5-diyl)biscarbamoyl]bis(diphenylmethylidene hydroxylamine) and α-(cyclohexylcarbamoyloxyimino)-α-(4-methoxyphenyl)acetonitrile; N-hydroxyimide carbamates, such as N-(octylcarbamoyloxy)phthalimide and N-(cyclohexylcarbamoyloxy)succinimide; formanilide derivatives, such as 4,4'-methylenebis(formanilide); aromatic sulfonamides, such as N-cyclohexyl-2-naphthalene sulfonamide and N-cyclohexyl-p-toluene sulfonamide; cobalt amine complexes, such as $Co(NH_2C_3H_7)Br+ClO_4^-$; and the like.

Examples of the photo-latent tertiary amine include α-aminoketone derivatives, α-ammonium ketone derivatives, benzylamine derivatives, benzylammonium salt derivatives, α-aminoalkene derivatives, α-ammonium alkene derivatives, amine imides, benzyloxycarbonylamine derivatives that generate amidine by light, salts of carboxylic acid and tertiary amine, and the like.

Suitable examples of the α-aminoketone derivatives include α-aminoketone compounds represented by Formulas (i) to (iv) below.

[Chemical Formula 19]

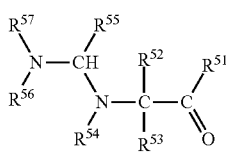

(i)

In Formula (i) above, $R^{51}$ represents an aromatic or heteroaromatic group, and $R^{51}$ is preferably an aromatic group (this is unsubstituted, or substituted at least one occurrence of substitution with $C_1$-$C_{18}$ alkyl, $C_3$-$C_{18}$ alkenyl, $C_3$-$C_{18}$ alkynyl, $C_1$-$C_{18}$ haloalkyl, $NO_2$, $NR^{58}R^{59}$, $N_3$, OH, CN, $OR^{60}$, $SR^{60}$, $C(O)R^{61}$, $C(O)OR^{62}$, or halogen, $R^{58}$, $R^{59}$, $R^{60}$, $R^{61}$, and $R^{62}$ are each hydrogen or $C_1$-$C_{18}$ alkyl), and more preferably selected from the group consisting of phenyl, naphthyl, phenanthryl, anthracyl, pyrenyl, 5,6,7,8-tetrahydro-2-naphthyl, 5,6,7,8-tetrahydro-1-naphthyl, thienyl, benzo[b]thienyl, naphtho[2,3-b]thienyl, thiathrenyl, dibenzofuryl, chromenyl, xanthenyl, thioxanthyl, phenoxathiinyl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyl, pteridinyl, carbazolyl, β-carbolinyl, phenanthridinyl, acridinyl, perimidinyl, phenanthrolinyl, phenazinyl, isothiazolyl, phenothiazinyl, isoxazolyl, furazanyl, terphenyl, stylbenyl, fluorenyl, and phenoxazinyl.

$R^{52}$ and $R^{53}$ each independently represent hydrogen, $C_1$-$C_{18}$ alkyl, $C_3$-$C_{18}$ alkenyl, $C_3$-$C_{18}$ alkynyl, or phenyl, and when $R^{52}$ is hydrogen or $C_1$-$C_{18}$ alkyl, $R^{53}$ is a group —CO—$R^{64}$ (in the formula, $R^{64}$ represents $C_1$-$C_{18}$ alkyl or phenyl); or, together with the carbonyl group and the C atom to which $R^{53}$ is bonded, $R^{51}$ and $R^{53}$ form a benzocyclopentanone group.

$R^{54}$ and $R^{56}$ together form a $C_2$-$C_{12}$ alkylene bridge that is unsubstituted or substituted with at least one $C_1$-$C_4$ alkyl group. Independent of $R^{54}$ and $R^{56}$, $R^{55}$ and $R^{57}$ together form a $C_2$-$C_{12}$ alkylene bridge that is unsubstituted or substituted with at least one $C_1$-$C_4$ alkyl group. $R^{54}$ and $R^{56}$ preferably together form a $C_3$ alkylene bridge, and $R^{55}$ and $R^{57}$ preferably together form propylene or pentylene.

[Chemical Formula 20]

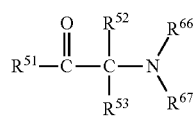

(ii)

[Chemical Formula 21]

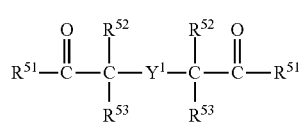

(iii)

[Chemical Formula 22]

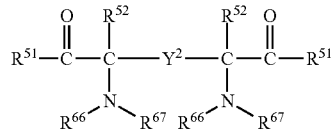

(iv)

In Formulas (ii) to (iv) above, $R^{51}$ to $R^{53}$ are respectively the same as $R^{51}$ to $R^{53}$ of Formula (i) above.

$R^{66}$ represents an alkyl group having from 1 to 12 carbons; or an alkyl group having from 2 to 4 carbons which is substituted with —OH, an alkoxy group having from 1 to 4 carbons, —CN, or —COO (alkyl having from 1 to 4 carbons); or $R^{66}$ represents an alkenyl group having from 3 to 5 carbons, a cycloalkyl group having from 5 to 12 carbons, or a phenyl-alkyl group having from 1 to 3 carbons.

$R^{67}$ represents an alkyl group having from 1 to 12 carbons; or an alkyl group having from 2 to 4 carbons which is substituted with —OH, an alkoxy group having from 1 to 4 carbons, —CN, or —COO (alkyl having from 1 to 4 carbons); or $R^{67}$ represents an alkenyl group having from 3 to 5 carbons, a cycloalkyl group having from 5 to 12 carbons, a phenyl-alkyl group having from 1 to 3 carbons, a phenyl group that is unsubstituted or substituted with an alkyl group having from 1 to 12 carbons, an alkoxy group having from 1 to 4 carbons, or —COO (alkyl having from 1 to 4 carbons); or alternatively, $R^{67}$ and $RR^{66}$ together represent an alkylene group having from 1 to 7 carbons, a phenyl-alkylene group having from 1 to 4 carbons, an o-xylylene group, a 2-butenylene group, or an oxyalkylene group having 2 or 3 carbons; $R^{66}$ and $R^{67}$ together represent an alkylene group having from 4 to 7 carbons which may be interrupted by —O—, —S—, or —CO—; or $R^{66}$ and $R^{67}$ together represent an alkylene group having from 3 to 7 carbons which may be substituted with OH, an alkoxy group having from 1 to 4 carbons, or —COO (alkyl having from 1 to 4 carbons). When a plurality of the $R^{66}$ moieties and the $R^{67}$ moieties exists, these may be the same or different.

$Y^1$ represents a divalent group represented by Formula (v) below, or a divalent group represented by —N($R^{68}$)— or —N($R^{68}$)—$R^{69}$—N($R^{68}$)—. $R^{68}$ represents an alkyl group having from 1 to 8 carbons, alkenyl group having from 3 to 5 carbons, phenyl-alkyl group having form 1 to 3 carbons, hydroxyalkyl group having from 1 to 4 carbons, or phenyl group. $R^{69}$ represents an alkylene group having from 2 to 16 carbons which may be branched or not branched and which may be interrupted by one or more of —O— or —S—.

$Y^2$ represents an alkylene group having from 1 to 6 carbons, cyclohexylene group, or direct bond.

[Chemical Formula 23]

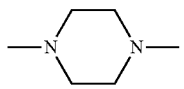

(v)

Examples of the α-amino ketone compound represented by Formula (i) above include α-amino ketone compounds, including those described in Japanese Unexamined Patent Application Publication No. 2001-512421A, such as 5-(4'-phenyl)phenacyl-1,5-diazabicyclo[4.3.0]nonane, 5-phenacyl-1,5-diazabicyclo[4.3.0]nonane, 5-naphthoylmethyl-1,5-diazabicyclo[4.3.0]nonane, 5-(1'-pyrenylcarbonylmethyl)-1,5-diazabicyclo[4.3.0]nonane, 5-(4'-nitro)phenacyl-1,5-diazabicyclo[4.3.0]nonane, 5-(2',4'-dimethoxy)phenacyl-1,5-diazabicyclo[4.3.0]nonane, 5-(9'-anthroylmethyl)-1,5-diazabicyclo[4.3.0]nonane, 8-(4'-phenyl)phenacyl-(1,8-diazabicyclo[5.4.0]-7-undecene), and the like.

Examples of the α-amino ketone compound represented by Formula (ii) above include α-amino ketone compounds, including those described in Japanese Unexamined Patent Application Publication No. H11-71450A, such as 4-(methylthiobenzoyl)-1-methyl-1-morpholinoethane (Irgacure 907), 2-benzyl-2-dimethylamino-1-(4-morpholinophenyl)-butanone (Irgacure 369), 2-(4-methylbenzyl)-2-dimethylamino-1-(4-morpholinophenyl)-butanone (Irgacure 379), and the like.

Examples of the α-ammonium ketone derivative include α-ammonium ketone compounds represented by Formula (vi) below.

[Chemical Formula 24]

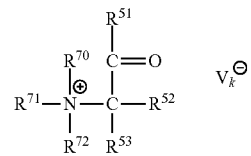

(vi)

In Formula (vi) above, k is 1 or 2 and equivalent to the number of positive charges of the cation. $V^-$ is a counter anion, and examples thereof include borate anions (tetraphenylborate, methyltriphenylborate, ethyltriphenylborate, propyltriphenylborate, butyltriphenylborate, and the like), phenolate anions (phenolate, 4-tert-butylphenolate, 2,5-di-tert-butylphenolate, 4-nitrophenolate, 2,5-dinitrophenolate, 2,4,6-trinitrophenolate, and the like), carboxylate anions (benzoate anion, toluic acid anion, phenylglyoxylic acid anion, and the like), and the like. Among these, from the perspective of photodegradability, borate anions and carboxylate anions are preferable, and a butyltriphenylborate anion, tetraphenylborate anion, benzoate anion, and phenylglyoxylic acid anion are more preferable. From the perspectives of photodegradability, and thermal stability, a tetraphenylborate anion and phenylglyoxylic acid anion are particularly preferable.

In Formula (vi) above, $R^{51}$ to $R^{53}$ are respectively the same as $R^{51}$ to $R^{53}$ of Formula (i) above.

$R^{70}$ to $R^{72}$ each independently represent a hydrogen, $C_1$-$C_{18}$ alkyl, $C_3$-$C_{18}$ alkenyl, $C_3$-$C_{18}$ alkynyl, or phenyl; furthermore $R^{70}$ and $R^{71}$ and/or $R^{72}$ and $R^{71}$ each independently form a $C_2$-$C_{12}$ alkylene crosslink; or together with a linked nitrogen, $R^{70}$ to $R^{72}$ form a phosphazene base of $P_1$, $P_2$, or P<t/4> type or a group having a structural Formula (a), (b), (c), (d), (e), (f), or (g) below.

[Chemical Formula 25]

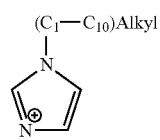

(a)

[Chemical Formula 26]

(b)

[Chemical Formula 27]

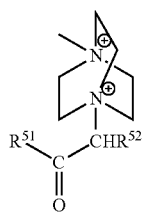

(c)

[Chemical Formula 28]

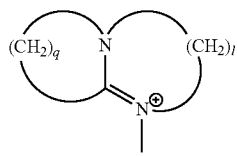
(d)

[Chemical Formula 29]

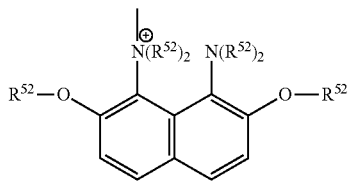
(e)

[Chemical Formula 30]

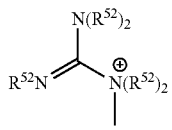
(f)

[Chemical Formula 31]

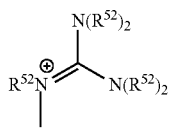
(g)

[Chemical Formula 32]

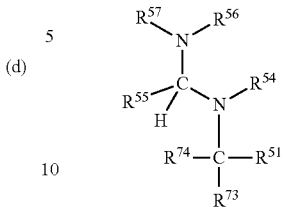
(vii)

In Formula (vii) above, $R^{51}$, $R^{54}$ to $R^{57}$ are respectively the same as $R^{51}$, $R^{54}$ to $R^{57}$ of Formula (i) above.

$R^{73}$ and $R^{74}$ each independently represent a phenyl group that may be substituted with a group selected from the group consisting of a hydrogen atom, alkyl group having from 1 to 20 carbons, halogen atom, alkoxy group having from 1 to 20 carbons, nitro group, carboxyl group, hydroxy group, mercapto group, alkylthio group having from 1 to 20 carbons, alkylsilyl group having from 1 to 20 carbons, acyl group having from 1 to 20 carbons, amino group, cyano group, alkyl group having from 1 to 20 carbons, phenyl group, naphthyl group, phenoxy group, and phenylthio group. $R^{73}$ and $R^{74}$ may be bonded to each other to form a cyclic structure.

Specific examples of the benzylamine derivative include benzylamine derivatives, including those described in Japanese Examined Patent Application Publication (Translation of PCT Application) No. 2005-511536A, such as 5-benzyl-1,5-diazabicyclo[4.3.0]nonane, 5-(anthracen-9-yl-methyl)-1,5-diazabicyclo[4.3.0]nonane, 5-(4'-cyanobenzyl)-1,5-diazabicyclo[4.3.0]nonane, 5-(3'-cyanobenzyl)-1,5-diazabicyclo[4.3.0]nonane, 5-(2'-chlorobenzyl)-1,5-diazabicyclo[4.3.0]nonane, 5-(2',4',6'-trimethylbenzyl)-1,5-diazabicyclo[4.3.0]nonane, 5-(4'-ethenylbenzyl)-1,5-diazabicyclo[4.3.0]nonane, 5-(3'-methoxybenzyl)-1,5-diazabicyclo[4.3.0]nonane, 5-(naphth-2-yl-methyl)-1,5-diazabicyclo[4.3.0]nonane, 1,4-bis(1,5-diazabicyclo[4.3.0]nonanylmethyl)benzene, 8-(2',6'-dichlorobenzyl)-1,8-diazabicyclo[5.4.0]undecane, and the like.

Examples of the benzylammonium salt derivative include benzylammonium salts represented by Formula (viii) below.

[Chemical Formula 33]

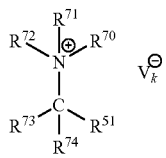
(viii)

In Formula (viii) above, $V^-$ and k are respectively the same as $V^-$ and k of Formula (vi) above. $R^{51}$ is the same as $R^{51}$ of Formula (i) above. $R^{70}$ to $R^{72}$ are respectively the same as $R^{70}$ to $R^{72}$ of Formula (vi) above. $R^{73}$ and $R^{74}$ are respectively the same as $R^{73}$ and $R^{74}$ of Formula (vii) above.

Specific examples of the benzylammonium salt derivative include photobase generators, described in WO/2010/095390 and WO/2009/122664, such as (9-anthryl)methyl triethylammonium tetraphenylborate, (9-oxo-9H-thioxanthen-2-yl)methyl triethylammonium tetraphenylborate, (9-anthryl)methyl 1-azabicyclo[2.2.2]octanium tetraphenylborate, (9-oxo-9H-thioxanthen-2-yl)methyl 1-azabicyclo In Formulas (a) to (g), $R^{51}$ and $R^{52}$ are respectively the same as $R^{51}$ and $R^{52}$ of Formula (i) above, and l and q are each independently a number in a range of 2 to 12.

Specific examples of the α-ammonium ketone derivative include α-ammonium ketone derivatives, including those described in Japanese Examined Patent Application Publication (Translation of PCT Application) No. 2001-513765A and WO/2005/014696, such as phenacyl triethylammonium tetraphenylborate, (4-methoxyphenacyl)triethylammonium tetraphenylborate, 1-phenacyl-(1-azonia-4-azabicyclo[2,2,2]-octane) tetraphenylborate, (1,4-phenacyl-1,4-diazoniabicyclo[2.2.2]octane) bis(tetraphenylborate), 1-naphthoylmethyl-(1-azonia-4-azabicyclo[2,2,2]-octane) tetraphenylborate, 1-(4'-phenyl)phenacyl-(1-azonia-4-azabicyclo[2.2.2]octane) tetraphenylborate, 5-(4'-phenyl)phenacyl-(5-azonia-1-azabicyclo[4.3.0]-5-nonene) tetraphenylborate, 5-(4'-methoxy)phenacyl-(5-azonia-1-azabicyclo[4.3.0]-5-nonene) tetraphenylborate, 5-(4'-nitro)phenacyl-(5-azonia-1-azabicyclo[4.3.0]-5-nonene) tetraphenylborate, and 5-(4'-phenyl)phenacyl-(8-azonia-1-azabicyclo[5.4.0]-7-undecene) tetraphenylborate, and the like.

Examples of the benzylamine derivative include benzylamine compounds represented by Formula (vii) below.

[2.2.2]octanium tetraphenylborate, 9-anthrylmethyl-1-azabicyclo[2.2.2]octanium tetraphenylborate, 5-(9-anthrylmethyl)-1,5-diazabicyclo[4.3.0]-5-nonenium tetraphenylborate, 8-(9-anthrylmethyl)-1,8-diazabicyclo [5.4.0]-7-undecenium phenylglyoxylate, N-(9-anthrylmethyl)-N,N,N-trioctylammonium tetraphenylborate, 8-(9-oxo-9H-thioxanthen-2-yl)methyl-1,5-diazabicyclo[4.3.0]-5-nonenium tetraphenylborate, 8-(4-benzoylphenyl)methyl-1,8-diazabicyclo[5.4.0]-7-undecenium tetraphenylborate, {8-(t-butyl-2-naphthalylmethyl)-1,8-diazabicyclo[5.4.0]-7-undecenium tetraphenylborate, 8-(9-oxo-9H-thioxanthen-2-yl)methyl-1,8-diazabicyclo[5.4.0]-7-undecenium tetraphenylborate, and N-benzophenonemethyl tri-N-methylammonium tetraphenylborate, and the like.

Examples of the α-amino alkene derivative include α-amino alkene derivatives, including those described in Japanese Examined Patent Application Publication (Translation of PCT Application) No. 2001-515500A, such as 5-(2'-(4''-biphenyl)allyl)-1,5-diazabicyclo[4.3.0]nonane, 5-(2'-(2''-naphthy)allyl)-1,5-diazabicyclo[4.3.0]nonane, 5-(2'-(4''-diethylaminophenyl)allyl)-1,5-diazabicyclo[4.3.0]nonane, 5-(1'-methyl-2'-(4''-biphenyl)allyl)-1,5-diazabicyclo[4.3.0]nonane, 5-(1'-methyl-2'-(2''-thioxanthyl)allyl)-1,5-diazabicyclo[4.3.0]nonane, 5-(1'-methyl-2'-(2''-fluorenyl)allyl)-1,5-diazabicyclo[4.3.0]nonane, and 8-(2'-(4''-biphenyl)allyl)-(1,8-diazabicyclo[5.4.0]-7-undecene), and the like.

Examples of the α-ammonium alkene derivative include α-ammonium alkene derivatives, including those described in Japanese Examined Patent Application Publication (Translation of PCT Application) No. 2002-523393A, such as N-(2'-phenylallyl)-triethylammonium tetraphenylborate, 1-(2'-phenylallyl)-(1-azonia-4-azabicyclo[2,2,2]-octane) tetraphenylborate, 1-(2'-phenylallyl)-(1-azonia-4-azabicyclo[2,2,2]-octane) tetraphenylborate, and 1-(2'-phenylallyl)-(1-azonia-4-azabicyclo[2,2,2]-octane) tris(3-fluorophenyl)hexylborate, and the like.

Examples of the amine imide include amine imides, including those described in WO/2002/051905, such as a [(2-hydroxy-3-phenoxypropyl)dimethylaminio](4-nitrobenzoyl)amine anion, [(2-hydroxy-3-phenoxypropyl)dimethylaminio](4-cyanobenzoyl)amine anion, [(2-hydroxy-3-phenoxypropyl)dimethylaminio](4-methoxybenzoyl)amine anion, [(2-hydroxy-3-phenoxypropyl)dimethylaminio]benzoylamine anion, and [(2-hydroxy-3-phenoxypropyl)dimethylaminio][4-(dimethylamino)benzoyl]amine anion, and the like.

Examples of the benzyloxycarbonylamine derivative that generates amidine by light include benzyloxycarbonylimidazoles, benzyloxycarbonylguanidines, diamine derivatives, and the like.

Examples of the benzyloxycarbonylimidazole include benzyloxycarbonylimidazoles, including those described in Japanese Unexamined Patent Application Publication No. H9-40750A, such as N-(2-nitrobenzyloxycarbonyl)imidazole, N-(3-nitrobenzyloxycarbonyl)imidazole, N-(4-chloro-2-nitrobenzyloxycarbonyl)imidazole, N-(4-nitrobenzyloxycarbonyl)imidazole, N-(5-methyl-2-nitrobenzyloxycarbonyl)imidazole, and N-(4,5-dimethyl-2-nitrobenzyloxycarbonyl)imidazole, and the like.

Examples of the benzyloxycarbonylguanidine include benzyloxycarbonyl tetramethylguanidine described in WO/97/31033A, and the like.

Examples of the diamine derivative include N—(N'-((1-(4,5-dimethoxy-2-nitrophenyl)ethoxy)carbonyl)aminopropyl)-N-methylacetamide and N—(N'-(4,5-dimethoxy-2-nitrobenzyloxycarbonyl)aminopropyl)-6-heptanelactam described in Japanese Unexamined Patent Application Publication No. 2011-116869A, and the like.

Examples of the salt of carboxylic acid and tertiary amine include ammonium α-ketocarboxylate salts, ammonium carboxylate salts, and the like.

Examples of the ammonium α-ketocarboxylate salt include ammonium α-ketocarboxylate salts, including those described in Japanese Unexamined Patent Application Publication No. S55-22669A, such as dimethyl/benzyl/ammonium salts of phenylglyoxylic acid, tri-n-butyl/ammonium salts of phenylglyoxylic acid, and the like.

Examples of the ammonium carboxylate salt include ketoprofen salts of diazabicycloundecene (DBU) and ketoprofen salts of 2-methylimidazole described in Japanese Unexamined Patent Application Publication No. 2009-280785A, xanthone acetate salts of diazabicycloundecene (DBU) and thioxanthone acetate salts of diazabicycloundecene (DBU) described in Japanese Unexamined Patent Application Publication No. 2011-80032A, 3-quinuclidinol salts of 2-(carboxymethylthio)thioxanthone and 3-quinuclidinol salts of 2-(carboxymethoxy)thioxanthone described in Japanese Unexamined Patent Application Publication No. 2007-262276A, and 3-quinuclidinol salts of trans-o-coumaric acid described in Japanese Unexamined Patent Application Publication No. 2010-254982A and Japanese Unexamined Patent Application Publication No. 2011-213783A.

Among the photobase generators (D) described above, photo-latent tertiary amines are preferable since the resulting base exhibits a high catalytic activity. From the perspectives of efficient generation of the base and excellent storage stability as a composition, benzylammonium salt derivatives, benzyl-substituted amine derivatives, α-aminoketone derivatives, and α-ammonium ketone derivatives are preferable, and α-aminoketone derivatives and α-ammonium ketone derivatives are more preferable from the perspective of even better generation efficiency of the base. From the perspective of solubility to the blended materials, α-ammonium ketone derivatives are even more preferable. Among the α-aminoketone derivatives, α-aminoketone compounds represented by Formula (i) above are preferable from the perspective of strong basicity of the resulting base, and α-aminoketone compounds represented by Formula (ii) above are preferable from the perspective of availability.

These photobase generators (D) may be used alone, or two or more types of these may be used in combination.

The compounded proportion of the photobase generator (D) is not particularly limited; however, the compounded proportion is preferably from 0.01 to 50 parts by mass, more preferably from 0.1 to 40 parts by mass, and even more preferably from 0.5 to 30 parts by mass, per 100 parts by mass of the crosslinkable silicon group-containing organic polymer (A).

In the photocurable composition of the present invention, the compounded proportion of the photobase generator and the silicon compound having a Si—F bond which are used as curing catalysts is, in terms of mass ratio of photobase generator:silicon compound having a Si—F bond, preferably from 1:0.008 to 1:300, and more preferably from 1:0.016 to 1:40, when a high molecular-weight compound having a number average molecular weight of 3,000 or greater, such as a fluorinated polymer, is used. When a low molecular-weight compound that has a fluorosilyl group and that has a number average molecular weight of less than 3,000 is used, the mass ratio of photobase generator:silicon compound having a Si—F bond is preferably from 1:0.008 to 1:300, and more preferably from 1:0.016 to 1:40.

The photocurable composition of the present invention preferably further comprises (E) at least one type of fluorine-based compound selected from the group consisting of boron trifluoride, complexes of boron trifluoride, fluorinating agents, and alkali metal salts of polyvalent fluoro compounds. In the present invention, the fluorine-based compound (E) becomes a compound that promotes a hydrolysis condensation reaction of the crosslinkable silicon group, and acts as a curing catalyst of the crosslinkable silicon group-containing organic polymer (A).

Examples of the complex of boron trifluoride include amine complexes, alcohol complexes, ether complexes, thiol complexes, sulfide complexes, carboxylic acid complexes, and water complexes of boron trifluoride, and the like. Among the complexes of boron trifluoride, amine complexes are particularly preferable from the perspective of achieving both stability and catalytic activity.

Examples of the amine compound used in the amine complex of boron trifluoride include compounds having a plurality of primary amino groups, such as ammonia, monoethylamine, triethylamine, piperidine, morpholine, cyclohexylamine, n-butylamine, monoethanolamine, diethanolamine, triethanolamine, guanidine, 2,2,6,6-tetramethylpiperidine, 1,2,2,6,6-pentamethylpiperidine, N-methyl-3,3'-iminobis(propylamine), ethylenediamine, diethylenetriamine, triethylenediamine, pentaethylenediamine, 1,2-diaminopropane, 1,3-diaminopropane, 1,2-diaminobutane, 1,4-diaminobutane, 1,9-diaminononane, ATU (3,9-bis(3-aminopropyl)-2,4,8,10-tetraoxaspiro[5.5]undecane), CTU guanamine, dodecanoic dihydrazide, hexamethylene diamine, m-xylylene diamine, dianisidine, 4,4'-diamino-3,3'-diethyldiphenylmethane, diaminodiphenyl ether, 3,3'-dimethyl-4,4'-diaminodiphenylmethane, tolidine base, m-toluylenediamine, o-phenylenediamine, m-phenylenediamine, p-phenylenediamine, melamine, 1,3-diphenylguanidine, di-o-tolylguanidine, 1,1,3,3-tetramethylguanidine, bis(aminopropyl)piperazine, N-(3-aminopropyl)-1,3-propanediamine, bis(3-aminopropyl) ether, and Jeffamine manufactured by Sun Techno Chemical Co., Ltd., compounds having a plurality of secondary amino groups, such as piperazine, cis-2,6-dimethylpiperazine, cis-2,5-dimethylpiperazine, 2-methylpiperazine, N,N'-di-t-butylethylenediamine, 2-aminomethylpiperidine, 4-aminomethylpiperidine, 1,3-di-(4-piperidyl)-propane, 4-aminopropylaniline, homopiperazine, N,N'-diphenylthiourea, N,N'-diethylthiourea, and N-methyl-1,3-propanediamine, and further include methylaminopropylamine, ethylaminopropylamine, ethylaminoethylamine, laurylaminopropylamine, 2-hydroxyethylaminopropylamine, 1-(2-aminoethyl)piperazine, N-aminopropylpiperazine, 3-aminopyrrolidine, 1-o-tolyl-biguanide, 2-aminomethylpiperazine, N-aminopropylaniline, ethylamineethylamine, 2-hydroxyethylaminopropylamine, laurylaminopropylamine, 2-aminomethylpiperidine, 4-aminomethylpiperidine, and compounds represented by Formula $H_2N(C_2H_4NH)_nH$ (n≈5) (trade name: Poly-8; manufactured by Tosoh Corporation), and heterocyclic tertiary amine compounds, such as N-alkylmorpholine, 1,8-diazabicyclo[5.4.0]undecene-7,6-dibutylamino-1,8-diazabicyclo[5.4.0]undecene-7,1,5-diazabicyclo[4.3.0]nonene-5,1,4-diazabicyclo[2.2.2]octane, pyridine, N-alkylpiperidine, 1,5,7-triazabicyclo[4.4.0]dec-5-ene, and 7-methyl-1,5,7-triazabicyclo[4.4.0]dec-5-ene, as well as aminosilane compounds, such as γ-aminopropyltriethoxysilane, γ-aminopropylmethyldiethoxysilane, 4-amino-3-dimethylbutyltriethoxysilane, N-β-(aminoethyl)-γ-aminopropyltriethoxysilane, N-β-(aminoethyl)-γ-aminopropylmethyldiethoxysilane, N-3-[amino(dipropyleneoxy)] aminopropyltriethoxysilane, (aminoethylaminomethyl) phenethyltriethoxysilane, N-(6-aminohexyl) aminopropyltriethoxysilane, N-phenyl-γ-aminopropyltriethoxysilane, and N-(2-aminoethyl)-11-aminoundecyltriethoxysilane, and the like.

Examples of commercially available amine complex of boron trifluoride include Anchor 1040, Anchor 1115, Anchor 1170, Anchor 1222, and BAK 1171, manufactured by Air Products Japan, Inc., and the like.

The fluorinating agent include nucleophilic fluorinating agents having fluorine anions as active species, and electrophilic fluorinating agents having electron deficient fluorine atoms as active species.

Examples of the nucleophilic fluorinating agent include 1,3,3,3-hexafluoro-1-dialkylaminopropane-based compounds, such as 1,1,2,3,3,3-hexafluoro-1-diethylaminopropane, trialkylaminetrishydrofluoride-based compounds, such as triethylaminetrishydrofluoride, dialkylaminosulfur trifluoride-based compounds, such as diethylaminosulfur trifluoride, and the like.

Examples of the electrophilic fluorinating agent include N-fluoropyridinium salt-based compounds, such as N,N'-difluoro-2,2'-bipyridinium bis(tetrafluoroborate) salt compounds and N-fluoropyridinium trifluoromethanesulfonate salt compounds, 4-fluoro-1,4-diazoniabicyclo[2.2.2]octane-based compounds, such as 4-fluoro-1,4-diazoniabicyclo[2.2.2]octane bis(tetrafluoroborate) salts, N-fluorobis(sulfonyl)amine-based compounds, such as N-fluorobis(phenylsulfonyl)amine, and the like. Among these, 1,1,2,3,3,3-hexafluoro-1-diethylaminopropane-based compounds are particularly preferable from the perspectives of being a liquid compound and being readily available.

Examples of the alkali metal salt of the polyvalent fluoro compound include sodium hexafluoroantimonate, potassium hexafluoroantimonate, sodium hexafluoroarsenate, potassium hexafluoroarsenate, hexafluarophosphate, sodium hexafluorophosphate, potassium hexafluorophosphate, sodium pentafluorohydroxyantimonate, potassium pentafluorohydroxyantimonate, tetrafluoroborate, sodium tetrafluoroborate, potassium tetrafluoroborate, sodium tetrakis(trifluoromethylphenyl)borate, sodium trifluoro(pentafluorophenyl)borate, potassium trifluoro(pentafluorophenyl)borate, sodium difluorobis(pentafluorophenyl)borate, potassium difluorobis(pentafluorophenyl)borate, and the like.

Among these, as the polyvalent fluoro compound component in the alkali metal salt of the polyvalent fluoro compound, tetrafluoroboric acid or hexafluorophosphoric acid is preferable. Furthermore, as the alkali metal in the alkali metal salt of the polyvalent fluoro compound, at least one type of alkali metal selected from the group consisting of lithium, sodium, and potassium is preferable.

The compounded proportion of the fluorine-based compound (E) is not particularly limited; however, the compounded proportion is preferably from 0.001 to 10 parts by mass, more preferably from 0.001 to 5 parts by mass, and even more preferably from 0.001 to 2 parts by mass, per 100 parts by mass of the crosslinkable silicon group-containing organic polymer (A). These fluorine-based compounds may be used alone, or two or more types of these may be used in combination.

The photocurable composition of the present invention may further comprise a silane coupling agent, and in particular, (F) an epoxy group-containing silane is preferable.

Examples of the silane coupling agent include epoxy group-containing silanes, such as γ-glycidoxypropyltrimethoxysilane, γ-glycidoxypropyltriethoxysilane, γ-glycidoxypropylmethyldimethoxysilane, and β-(3,4-epoxycyclohexyl)ethyltrimethoxysilane; amino group-containing silanes, such as γ-aminopropyltrimethoxysilane, γ-aminopropyltriethoxysilane, γ-aminopropylmethyldimethoxysilane, N-(β-aminoethyl)-γ-aminopropyltrimethoxysilane, N-(β-aminoethyl)-γ-aminopropyltriethoxysilane, N-(β-aminoethyl)-γ-aminopropylmethyldimethoxysilane, and 1,3-diaminoisopropyltrimethoxysilane; ketimine type silanes, such as N-(1,3-dimethylbutylidene)-3-(triethoxysilyl)-1-propaneamine and N-(1,3-dimethylbutylidene)-3-(trimethoxysilyl)-1-propaneamine; mercapto group-containing silanes, such as γ-mercaptopropyltrimethoxysilane and γ-mercaptopropylmethyldimethoxysilane; vinyl type unsaturated group-containing silanes, such as vinyltrimethoxysilane, vinyltriethoxysilane, γ-methacryloyloxypropyltrimethoxysilane, and γ-acryloyloxypropylmethyldimethoxysilane; chlorine atom-containing silanes, such as γ-chloropropyltrimethoxysilane; isocyanate-containing silanes such as γ-isocyanatepropyltriethoxysilane and γ-isocyanatepropylmethyldimethoxysilane; alkyl silanes, such as hexyltrimethoxysilane, hexyltriethoxysilane, and decyltrimethoxysilane; phenyl group-containing silanes, such as phenyltrimethoxysilane, phenyltriethoxysilane, diphenyldimethoxysilane, and diphenyldiethoxysilane; and the like. However, the silane coupling agent is not limited to these. Furthermore, a modified amino group-containing silanes in which an amino group is modified by reacting the amino group-containing silane with the epoxy group-containing compound, isocyanate group-containing compound, or (meth)acryloyl group-containing compound that contains silane, may be used.

The amino group-containing silane acts as a silanol condensation catalyst, and ketimine type silane forms amino group-containing silane in the presence of water and this acts as a silanol condensation catalyst. Therefore, use of a silane coupling agent, which is not amino group-containing silane or ketimine type silane, is preferable. Furthermore, when amino group-containing silane or ketimine type silane is used, the amino group-containing silane or ketimine type silane should be used with care so that the type and used amount are within the ranges which can achieve the purpose/effect of the present invention.

The compounded proportion of the silane coupling agent is not particularly limited; however, the compounded proportion is preferably from 0.2 to 20 parts by mass, more preferably from 0.3 to 10 parts by mass, and even more preferably from 0.5 to 5 parts by mass, per 100 parts by mass of the crosslinkable silicon group-containing organic polymer (A). These silane coupling agents may be used alone, or two or more types of these may be used in combination.

The photocurable composition of the present invention may further contain a silanol condensation catalyst, which is a catalyst for crosslinking and curing the crosslinkable silicon group-containing organic polymer (A). The crosslinking and curing proceed by actions of moisture. When a silanol condensation catalyst is included, the silanol condensation catalyst preferably has a small catalytic activity, or preferably has a small catalytic activity by itself but increases the activity thereof when amine is used as a co-catalyst. Examples of the silanol condensation catalyst that has a small catalytic activity by itself but increases the activity thereof when amine is used as a co-catalyst include the silicon compounds having a Si—F bond described above. Examples of the silanol condensation catalyst having a small catalytic activity include organometallic compounds and the like. Use of metal alkoxide or chelate compounds thereof is preferable. Examples of the metal alkoxide and chelate compounds thereof include alkoxides of metal such as aluminum, titanium, zirconium, or cerium, and the alkoxides of metal that is chelated by an acetoacetic acid ester or acetylacetone. Among these, aluminum chelate compounds (aluminum complexes) are preferable from the perspective of ensuring usable life that is required when the photocurable composition of the present invention is used.

Although acids and photoacid generators are also known as silanol condensation catalysts, it is not suitable to use acids and photoacid generators particularly for electronic circuits or the like since acids corrode metals. Furthermore, with tin catalysts which are often used as silanol condensation catalysts, it is difficult to obtain sufficient usable life in screen printing or the like since the activity of tin catalysts is too large. Therefore, as the silanol condensation catalyst, alkoxides of metal such as aluminum, titanium, zirconium, or cerium, and chelate compounds thereof are preferable. In particular, chelate compounds are preferable.

An aluminum complex is a complex having an Al—O bond, and examples of such compound include compounds in which an alkoxy group, phenoxy group, acyloxy group, o-carbonylphenolate group, β-diketonate, or the like is bonded to an aluminum atom.

Note that, as the alkoxy group, alkoxy group having from 1 to 10 carbons are preferable, and more specifically, methoxy, ethoxy, isopropoxy, butoxy, pentyloxy, and the like are exemplified. As the phenoxy group, a phenoxy group, o-methylphenoxy group, o-methoxyphenoxy group, 2,6-dimethylphenoxy group, and the like are exemplified. Examples of the acyloxy group include ligands, such as acetato, propionato, isopropionato, butyrato, stearato, ethylacetoacetato, propylacetoacetato, butylacetoacetato, diethyl maleate, and dipivaloylmethanato. Examples of the o-carbonylphenolato group include salicylaldehydato. Examples of the β-diketonato group include acetylacetonato, trifluoroacetylacetonato, hexafluoroacetylacetonato, ligands represented by Formulas (10) and (11) below, and the like.

[Chemical Formula 34]

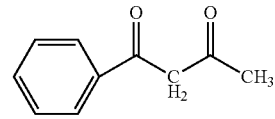

(10)

[Chemical Formula 35]

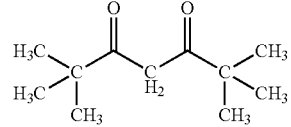

(11)

Specific examples include trismethoxy aluminum, trisethoxy aluminum, trisisopropoxy aluminum, trisphenoxy aluminum, trisparamethylphenoxy aluminum, isopropoxy diethoxy aluminum, trisbutoxy aluminum, tris-2-ethylhexoxy aluminum, trisacetoxy aluminum, trisstearato aluminum, trisbutyrato aluminum, trispropionato aluminum, trisisopropionato aluminum, trisacetylacetonato aluminum, tristrifluoroacetylacetonato aluminum, trishexafluoroacetylacetonato aluminum, trisethylacetoacetato aluminum, trissalicylaldehydato aluminum, trisdiethylmalolato aluminum, trispropylacetoacetato aluminum, trisbutylacetoacetato aluminum, trisdipivaloylmethanato aluminum, cyclohexyloxy/ diisopropoxy aluminum, diisopropoxy/trichloroacetato aluminum, isopropoxy/distearato aluminum, diisopropoxy/acetylacetonato aluminum, diisopropoxy/ethylacetoacetato aluminum, diacetylacetonatopivaloylmethanato aluminum, and compounds represented by chemical Formulas (12) to (21).

[Chemical Formula 36]

(12)

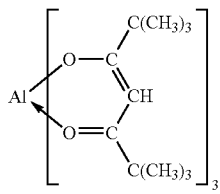

[Chemical Formula 37]

(13)

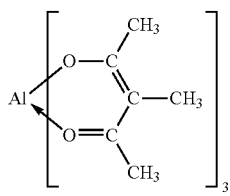

[Chemical Formula 38]

(14)

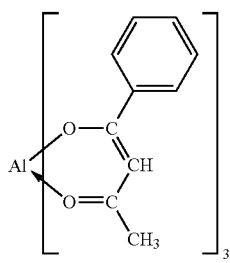

[Chemical Formula 39]

(15)

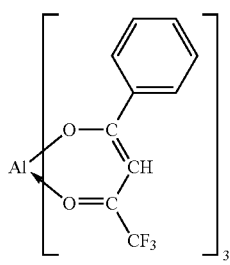

[Chemical Formula 40]

(16)

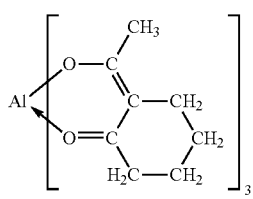

[Chemical Formula 41]

(17)

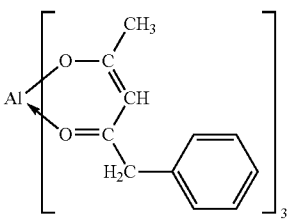

[Chemical Formula 42]

(18)

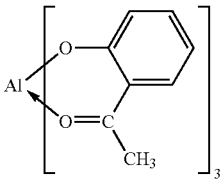

[Chemical Formula 43]

(19)

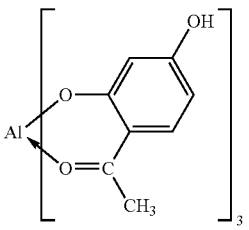

[Chemical Formula 44]

(20)

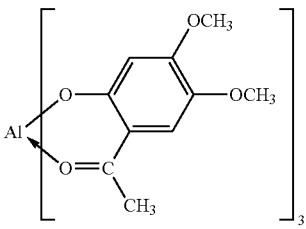

[Chemical Formula 45]

(21)

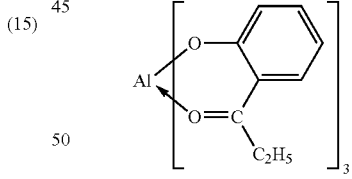

The aluminum complex may be used alone or two or more types can be mixed for use. Among these, since solubility and/or activity after storing for a long period of time is less likely to be reduced, trisacetylacetonato aluminum and tris-ethylacetoacetato aluminum are particularly preferable.

Examples of the complexes of titanium or zirconium include tetraisopropyl titanate, tetraisobutyl titanate, or triisopropyl acetylacetonyl titanate; tetraisopropyl zirconate or triisopropyl acetylacetonyl zirconate; or cerium triisopropoxide or cerium acetylacetonate diisopropoxide.

The compounded proportion of the silanol condensation catalyst is not particularly limited; however, the compounded proportion is preferably from 0.01 to 30 parts by mass, and more preferably from 0.1 to 20 parts by mass, per 100 parts by mass of the crosslinkable silicon group-containing organic polymer (A). These silanol condensation catalysts may be used alone, or two or more types of these may be used in combination.

The photocurable composition of the present invention preferably further comprises a photosensitizer. As the photosensitizer, carbonyl compounds having a triplet energy of 225 to 310 kJ/mol are preferable, and examples thereof include xanthone, thioxanthone, 2-chlorothioxanthone, 2,4-dimethylthioxanthone, 2,4-diethylthioxanthone, 2,4-diisopropylthioxanthone, isopropylthioxanthone, phthalimide, anthraquinone, 9,10-dibutoxyanthracene, acetophenone, propiophenone, benzophenone, acylnaphthalene, 2-(acylmethylene)thiazoline, 3-acylcoumarin and 3,3'-carbonylbiscoumarin, perylene, coronene, tetracene, benzanthracene, phenothiazine, flavin, acridine, ketocoumarin, and the like. Thioxanthone, 3-acylcoumarin, and 2-(aroylmethylene)-thiazoline are preferable, and thioxanthone and 3-acylcoumarin are more preferable. These sensitizers enhances the reactivity of the generated amine base without shortening the shelf life of the composition.

Furthermore, as the photosensitizer, energy ray-cleavage type radical generators, which are photo-radical generators that generate radicals via cleavage of the compound when energy rays, such as light, are irradiated, are more preferable. When the energy ray-cleavage type radical generator is used, significantly fast cure rate can be observed and the photocurable composition of the present invention can be cured immediately after irradiation of energy rays, compared to the cases where a photosensitizer, such as benzophenones or thioxanthones, which has been known as a sensitizer for photo-base initiators, is used.

Examples of the energy ray-cleavage type radical generator include aryl alkyl ketones, such as benzoin ether derivatives and acetophenone derivatives, oxime ketones, acylphosphine oxides, S-phenyl thiobenzoates, titanocenes, and derivatives formed by increasing molecular weights of these. Examples of commercially available cleavage type radical generator include 1-(4-dodecylbenzoyl)-1-hydroxy-1-methylethane, 1-(4-isopropylbenzoyl)-1-hydroxy-1-methylethane, 1-benzoyl-1-hydroxy-1-methylethane, 1-[4-(2-hydroxyethoxy)-benzoyl]-1-hydroxy-1-methylethane, 1-[4-(acryloyloxyethoxy)-benzoyl]-1-hydroxy-1-methylethane, diphenyl ketone, phenyl-1-hydroxy-cyclohexylketone, benzyldimethylketal, bis(cyclopentadienyl)-bis(2,6-difluoro-3-pyrryl-phenyl)titanium, ($\eta^6$-isopropylbenzene)-($\eta^5$-cyclopentadienyl)-iron(II) hexafluorophosphate, trimethylbenzoyl diphenylphosphine oxide, bis(2,6-dimethoxy-benzoyl)-(2,4,4-trimethyl-pentyl)-phosphine oxide, bis(2,4,6-trimethylbenzoyl)-2,4-dipentoxyphenylphosphine oxide, bis(2,4,6-trimethylbenzoyl)phenyl-phosphine oxide, and the like.

The compounded proportion of the photosensitizer is not particularly limited; however, the compounded proportion is preferably from 0.01 to 5% by mass, and more preferably from 0.025 to 2% by mass, in the composition. These photosensitizers may be used alone, or two or more types of these may be used in combination.

To the photocurable composition of the present invention, various additives, such as bulk fillers, plasticizers, moisture absorbents, physical property modifiers for enhancing tensile characteristics, reinforcing agents, coloring agents, flame retardants, sagging preventing agents, antioxidants, oxidation inhibitors, ultraviolet absorbing agents, solvents, odorants, pigments, and dyes, may be added as necessary.

Examples of the bulk filler include talc, clay, calcium carbonate, magnesium carbonate, water-free silicon, water-containing silicon, calcium silicate, titanium dioxide, carbon black, and the like. These bulk fillers may be used alone, or two or more types of these may be used in combination.

Examples of the plasticizers include phosphoric acid esters such as tributyl phosphate and tricresyl phosphate, phthalic acid esters such as dioctyl phthalate, aliphatic monobasic acid esters such as glycerin monooleate, aliphatic dibasic acid esters such as dioctyl adipate, polypropylene glycols, and the like. These plasticizers may be used alone, or two or more types of these may be used in combination.

As the moisture absorbent, silane coupling agents described above and silicates are suitable. The silicate is not particularly limited, and examples thereof include tetraalkoxysilane and partially hydrolyzed condensates thereof. Specific examples thereof include tetraalkoxysilanes (tetraalkylsilicates), such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxysilane, tetra-i-butoxysilane, and tetra-t-butoxysilane, and partially hydrolyzed condensates thereof.

The photocurable composition of the present invention may be a one-part composition or a two-part composition depending on the requirement; however, in particular, the photocurable composition can be suitably used as a one-part composition. The photocurable composition of the present invention is a photocurable composition that cures by light irradiation and is an ordinary temperature-photocurable composition that can be cured at ordinary temperature (e.g. 23° C.). The photocurable composition of the present invention can be suitably used as an ordinary temperature-photocurable type curable composition; however, the curing may be promoted by heating as necessary.

When active energy rays are irradiated during curing, as the active energy rays, light rays such as ultraviolet rays, visible rays, and infrared rays, electromagnetic waves such as X-rays and γ-rays, electron beams, proton beams, neutron beams, and the like can be utilized. From the perspectives of cure rate, availability and price of irradiating device, ease in handling under sunlight or ordinary lighting, curing by irradiating with ultraviolet rays or electron beams is preferable, and curing by ultraviolet ray irradiation is more preferable. The active energy rays are not particularly limited; however, examples thereof include high-pressure mercury-vapor lamps, low-pressure mercury-vapor lamps, electron beam irradiation devices, halogen lamps, light emitting diodes, semiconductor lasers, metal halides, and the like, depending on the properties of the used photobase generator.

In the case of ultraviolet rays, irradiation energy of 10 to 20,000 mJ/cm$^2$ is preferable, and 50 to 10,000 mJ/cm$^2$ is more preferable. When the irradiation energy is less than 10 mJ/cm$^2$, curability may be insufficient. When the irradiation energy is greater than 20,000 mJ/cm$^2$, the substrate may be damaged and time and cost are wasted for excessive irradiation.

The method of producing the photocurable composition of the present invention is not particularly limited, and for example, the photocurable composition can be produced by blending predetermined amounts of the component (A) and the component (B) and, as necessary, other materials to be blended, and then degassing and stirring. The order of blending the components (A) and (B) and other materials to be blended is not particularly limited, and can be appropriately decided.

The photocurable composition of the present invention is a photocurable composition that achieves excellent workability and storage stability and that can be cured rapidly, and is advantageously used as an adhesive composition. The photocurable composition of the present invention can be suitably used as an adhesive agent, sealing material, adhesive material, coating, potting material, coating material, putty material, primer, and the like. The photocurable composition of the present invention can be suitably used for applications, such as coating agents used in coating for moisture-proofing and insulating a mounting circuit board or the like, for coating a panel or a periphery part of a panel for solar power generation, and the like; sealing agents for multi-layered glass and sealing agents for construction and industrial use, such as a sealing agent for vehicles; electric/electronic component materials, such as a sealing agent for back face of a solar battery; electrical insulating materials, such as an insulating coating material for electric wires and cables; adhesive materials; adhesive agents; elastic adhesive agents; and contact adhesive agents. Furthermore, the method of coating the photocurable composition of the present invention is not particularly limited; however, coating methods, such as screen printing, stencil printing, roll printing, flexographic printing, spin coating, and roll coating, are suitably used. Since the photocurable composition of the present invention has a long tack-free time (TFT), i.e. long pot life, the photocurable composition can be retained in a coating device for a long time period and can be suitably used in roll coater, knife coater, screen printing, and the like.

EXAMPLE

The present invention will be further specifically described below using examples; however, these examples are set forth to illustrate the present invention, and the scope of the present invention is not limited thereto.
1) Measurement of Number Average Molecular Weight The number average molecular weight was measured by gel permeation chromatography (GPC) under the following conditions. In the present invention, measurement was performed by GPC under these measurement conditions, and the modal value for molecular weight based on calibration with polyethylene glycol standards was referred to as "number average molecular weight".

Analysis instrument: Alliance (manufactured by Waters Corporation), 2410 refractive index detector (manufactured by Waters Corporation), 996 multiwavelength detector manufactured by Waters Corporation), and Millennium data processing device
Column: Plgel GUARD+5 µm Mixed-C×3 (50×7.5 mm, 300×7.5 mm; manufactured by Polymer Laboratories)
Flow rate: 1 mL/min
Polymer used for calibration: Polyethylene glycol
Measurement temperature: 40° C.
Solvent used for GPC measurement: THF
2) Measurements of NMR and IR NMR and IR measurements were performed using the following measurement instruments.
FT-NMR spectrometer: JNM-ECA 500 (500 MHz), manufactured by JEOL Ltd.
FT-IR spectrometer: FT-IR 460 Plus, manufactured by JASCO Corporation Synthesis Example 1

Synthesis of Crosslinkable Silicon Group-Containing Compound B1 that Generates an Amino Group via Light In a flask, 15.3 parts of 2-nitrobenzyl alcohol and 344 parts of toluene were loaded and refluxed at approximately 113° C. for 60 minutes. Thereafter, 24.7 parts of 3-isocyanatepropyltriethoxysilane was added dropwise to the mixture and stirred for 5 hours to obtain a synthesized product (crosslinkable silicon group-containing compound that generates an amino group by light and that is represented by Formula (XV) below. Hereinafter, referred to as "aminosilane-generating compound via light B1"). As a result of IR spectrum measurement of the aminosilane-generating compound via light B1, a —N=C=O bond was not detected.

[Chemical Formula 46]

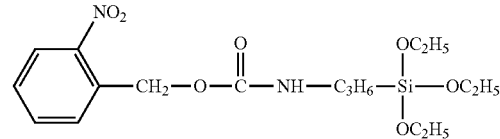

(XV)

Synthesis Example 2

Synthesis of Polyoxyalkylene Polymer Having Trimethoxysilyl Group at Terminal A1

In a flask equipped with a stirring equipment, a nitrogen gas introduction tube, a thermometer, and a reflux condenser, propylene oxide was reacted using ethylene glycol as an initiator in the presence of a zinc hexacyanocobaltate-glyme complex catalyst to obtain polyoxypropylene triol. To the obtained polyoxypropylene triol, a methanol solution of sodium methoxide was added, and then methanol was removed by heating under reduced pressure to convert the terminal hydroxy group of the polyoxypropylene triol to sodium alkoxide, thereby obtaining a polyoxyalkylene polymer M1.

Thereafter, the polyoxyalkylene polymer M1 was reacted with allyl chloride, then unreacted allyl chloride was removed. Purification was performed to obtain a polyoxyalkylene polymer having allyl groups at terminals. To this polyoxyalkylene polymer having allyl groups at terminals, trimethoxysilane, which was a hydrogenated silicon compound, was added to 150 ppm of platinum-vinyl siloxane complex isopropanol solution having a platinum content of 3 wt. %, and reacted to obtain a polyoxyalkylene polymer having trimethoxysilyl groups at terminals A1.

As a result of molecular weight measurement of the obtained polyoxyalkylene polymer having trimethoxysilyl groups at terminals A1 by GPC, the molecular weight at the peak was 25,000, and the molecular weight distribution was 1.3. The number of trimethoxysilyl groups at terminals was 1.7 per one molecule determined by $H^1$-NMR measurement.

Synthesis Example 3

Synthesis of Polyoxyalkylene Polymer Having Trimethoxysilyl Group at Terminal A2

In a flask equipped with a stirring equipment, a nitrogen gas introduction tube, a thermometer, and a reflux condenser, propylene oxide was reacted using ethylene glycol as an initiator in the presence of a zinc hexacyanocobaltate-glyme complex catalyst to obtain polyoxypropylene triol. To the obtained polyoxypropylene triol, a methanol solution of sodium methoxide was added, and then methanol was removed by heating under reduced pressure to convert the terminal hydroxy group of the polyoxypropylene triol to sodium alkoxide, thereby obtaining a polyoxyalkylene polymer M2.

Thereafter, the polyoxyalkylene polymer M2 was reacted with allyl chloride, then unreacted allyl chloride was removed. Purification was performed to obtain a polyoxyalkylene polymer having allyl groups at terminals. To this polyoxyalkylene polymer having allyl groups at terminals, trimethoxysilane, which was a hydrogenated silicon compound, was added to 150 ppm of platinum-vinyl siloxane complex isopropanol solution having a platinum content of 3 wt. %, and reacted to obtain a polyoxyalkylene polymer having trimethoxysilyl groups at terminals A2.

As a result of molecular weight measurement of the obtained polyoxyalkylene polymer having trimethoxysilyl group at terminals A2 by GPC, the molecular weight at the peak was 12,000, and the molecular weight distribution was 1.3. The number of trimethoxysilyl groups at terminals was 1.7 per one molecule determined by $H^1$-NMR measurement.

Synthesis Example 4

Synthesis of (meth)Acrylic-Based Polymer Having Trimethoxysilyl Group A3

In a flask equipped with a stirring equipment, a nitrogen gas introduction tube, a thermometer, and a reflux condenser, 40.00 g of ethyl acetate, 70.00 g of methyl methacrylate, 30.00 g of 2-ethylhexyl methacrylate (manufactured by Tokyo Chemical industry Co., Ltd.), 12.00 g of 3-methacryloxypropyl trimethoxysilane (trade name: KBM 503, manufactured by Shin-Etsu Chemical Co., Ltd.), and 0.10 g of titanocene dichloride as a metal catalyst were loaded and heated to 80° C. while a nitrogen gas was introduced to the flask. Thereafter, 4.30 g of 3-mercaptopropyl trimethoxysilane which had undergone nitrogen gas purging sufficiently was added at once to the flask while the mixture was being stirred. After adding the 4.30 g of 3-mercaptopropyl trimethoxysilane, heating and cooling were performed for 4 hours so that the temperature of the content of the flask, which was being stirred, was maintained at 80° C. Furthermore, another 4.30 g of 3-mercaptopropyl trimethoxysilane which had undergone nitrogen gas purging sufficiently was further added to the flask over 5 minutes while the mixture was being stirred. After the further addition of all the 4.30 g of 3-mercaptopropyl trimethoxysilane, reaction was performed for 4 hours while cooling and heating were further performed so that the temperature of the content of the flask, which was being stirred, was maintained at 90° C. After the total of 8 hours and 5 minutes of reaction, the temperature of the reaction product was cooled down to room temperature. Polymerization was terminated by adding 20.00 g of benzoquinone solution (95% THF solution) to the reaction product to obtain (meth) acrylic-based polymer having a trimethoxysilyl group A3. The molecular weight at the peak was 4,000, and the molecular weight distribution was 2.4. The number of the contained trimethoxysilyl groups was 2.00 per one molecule determined by $H^1$-NMR measurement.

Synthesis Example 5

Synthesis of Fluorinated Polymer C1

In another flask equipped with a stirring equipment, a nitrogen gas introduction tube, a thermometer, and a reflux condenser, propylene oxide was reacted using polyoxypropylene diol having a molecular weight of approximately 2,000 as an initiator in the presence of a zinc hexacyanocobaltate-glyme complex catalyst to obtain polyoxypropylene diol having the hydroxyl value equivalent molecular weight of 14,500, and the molecular weight distribution of 1.3. To the obtained polyoxypropylene diol, a methanol solution of sodium methoxide was added, and then methanol was removed by heating under reduced pressure to convert the terminal hydroxy group of the polyoxypropylene diol to sodium alkoxide, thereby obtaining a polyoxyalkylene polymer M3.

Thereafter, the polyoxyalkylene polymer M3 was reacted with allyl chloride, then unreacted allyl chloride was removed. Purification was performed to obtain a polyoxyalkylene polymer having allyl groups at terminals. To this polyoxyalkylene polymer having allyl groups at terminals, methyldimethoxysilane, which was a hydrogenated silicon compound, was added to 150 ppm of platinum-vinyl siloxane complex isopropanol solution having a platinum content of 3 wt. %, and reacted to obtain a polyoxyalkylene polymer having methyldimethoxysilyl groups at terminals A4.

As a result of molecular weight measurement of the obtained polyoxyalkylene polymer having methyldimethoxysilyl groups at terminals A4 by GPC, the molecular weight at the peak was 15,000, and the molecular weight distribution was 1.3. The number of methyldimethoxysilyl groups at terminals was 1.7 per one molecule determined by $H^1$-NMR measurement.

In a flask equipped with a stirring equipment, a nitrogen gas introduction tube, a thermometer, and a reflux condenser, a nitrogen gas was purged after reducing pressure and degassing, 2.4 g of $BF_3$ diethylether complex was added under a nitrogen stream and heated to 50° C. Thereafter, a mixture of 1.6 g dehydrated methanol was gradually added dropwise thereto and mixed. In another flask equipped with a stirring equipment, a nitrogen gas introduction tube, a thermometer, and a reflux condenser, 100 g of the obtained polymer A4 and 5 g of toluene were placed. After the mixture was stirred at 23° C. for 30 minutes, the mixture was heated to 110° C. and stirred under reduced pressure for 2 hours to remove the toluene. To this container, 4.0 g of the obtained mixture was gradually added dropwise under a nitrogen stream. After the completion of the addition, the reaction temperature was increased to 120° C. and reaction was performed for 30 minutes. After the completion of the reaction, degassing under reduced pressure was performed to remove unreacted materials. A polyoxyalkylene polymer having fluorosilyl groups at terminals C1 (hereinafter, referred to as "fluorinated polymer C1") was obtained. As a result of $^1$H-NMR spectrum measurement (measured in a $CDCl_3$ solvent using NMR 400, manufactured by Shimadzu Corporation) of the obtained fluorinated polymer C1, a peak (m, 0.63 ppm) that corresponded to silylmethylene ($—CH_2—Si$) of polymer A4, which was the raw material, disappeared, and a broad peak appeared on the low magnetic field side (0.7 ppm or greater).

Synthesis Example 6

Synthesis of Crosslinkable Silicon Group-Containing Compound B2 that Generates an Amino Group via Light In a flask, 20.8 parts of 9-(hydroxymethyl)anthracene and 344 parts of toluene were loaded and refluxed at approximately 113° C. for 60 minutes. Thereafter, 24.7 parts of 3-isocyanatepropyltriethoxysilane was added dropwise to the mixture and stirred for 5 hours to obtain a synthesized product (crosslinkable silicon group-containing compound that generates an amino group by light. Hereinafter, referred to as "aminosilane-generating compound via light B2"). As a result of IR spectrum measurement of the aminosilane-generating compound via light B2, a —N═C═O bond was not detected.

Synthesis Example 7

Synthesis of Crosslinkable Silicon Group-Containing Compound B3 that Generates an Amino Group via Light In a flask, 21.2 parts of benzoin and 344 parts of toluene were loaded and refluxed at approximately 113° C. for 60 minutes. Thereafter, 24.7 parts of 3-isocyanatepropyltriethoxysilane was added dropwise to the mixture and stirred for 5 hours to obtain a synthesized product (crosslinkable silicon group-containing compound that generates an amino group by light. Hereinafter, referred to as "aminosilane-generating compound via light B3"). As a result of IR spectrum measurement of the aminosilane-generating compound via light B3, a —N═C═O bond was not detected.

Synthesis Example 8

Synthesis of Crosslinkable Silicon Group-Containing Compound B4 that Generates an Amino Group via Light In a flask, 15.3 parts of 4-nitrobenzyl alcohol and 344 parts of toluene were loaded and refluxed at approximately 113° C. for 60 minutes. Thereafter, 24.7 parts of 3-isocyanatepropyltriethoxysilane was added dropwise to the mixture and stirred for 5 hours to obtain a synthesized product (crosslinkable silicon group-containing compound that generates an amino group by light. Hereinafter, referred to as "aminosilane-generating compound via light B4"). As a result of IR spectrum measurement of the aminosilane-generating compound via light B4, a —N═C═O bond was not detected.

Working Example 1

In a 300 mL flask equipped with a stirrer, a thermometer, a nitrogen gas introduction port, a monomer charging port, and a water-cooled condenser, the polymers A1 to A3 obtained in Synthesis Examples 2 to 4, the aminosilane-generating compound via light B1, a photo-radical generator, and the fluorinated polymer C1 were loaded at the compounding proportions shown in Table 1, stirred, and dissolved. Furthermore, in another 100 mL eggplant shaped flask, a photobase generator and propylenecarbonate were loaded at the compounding proportions shown in Table 1, stirred, and dissolved. All of the amount of this solution was charged to the 300 mL flask containing the components weighed as described above, and stirred under reduced pressure to obtain a photocurable composition.

TABLE 1

| | Working Example 1 | Working Example 2 | Working Example 3 | Working Example 4 | Working Example 5 | Working Example 6 | Working Example 7 | Working Example 8 |
|---|---|---|---|---|---|---|---|---|
| (A) Polyoxyalkylene polymer A1 | 50 | 50 | 50 | 50 | 50 | 50 | 50 | 50 |
| (A) Polyoxyalkylene polymer A2 | 20 | 20 | 20 | 20 | 20 | 20 | 20 | 20 |
| (A) (Meth)acrylic-based polymer A3 | 30 | 30 | 30 | 30 | 30 | 30 | 30 | 30 |
| (B) Aminosilane-generating compound via light B1 | 10 | 10 | — | — | — | 10 | 10 | 10 |
| (B) Aminosilane-generating compound via light B2 | — | — | 10 | — | — | — | — | — |
| (B) Aminosilane-generating compound via light B3 | — | — | — | 10 | — | — | — | — |
| (B) Aminosilane-generating compound via light B4 | — | — | — | — | 10 | — | — | — |
| (D) Photobase generator Irgacur 379 50% PC solution *[1] | 10 | — | 10 | 10 | 10 | — | — | 10 |
| (D) Photobase generator SA-2 20% PC solution *[2] | — | — | — | — | — | 2.5 | — | — |
| (C) Fluorinated polymer C1 | 5 | — | 5 | 5 | 5 | 5 | — | 5 |
| (E) Boron trifluoride monoethylamine 10% PC solution | — | — | — | — | — | — | 4 | — |
| γ-aminopropyltriethoxysilane | — | — | — | — | — | — | — | — |
| Aluminum chelate compound *[3] | — | 8 | — | — | — | — | — | — |
| Photo-radical generator *[4] | 2.5 | — | 2.5 | 2.5 | 2.5 | — | — | 2.5 |
| (F) Epoxy group-containing silane KBM-403 *[5] | — | — | — | — | — | — | — | 2 |
| TFT after UV irradiation | 4 min | 1 hr | 5 min 30 sec | 7 min 30 sec | 4 min | 1 min | 8 min | 5 min |
| TFT without UV irradiation | 1 day or longer | 3 hr | 1 day or longer | 1 day or longer | 1 day or longer | 1 day or longer | 8 hr | 1 day or longer |

TABLE 1-continued

| | | | | | | | | |
|---|---|---|---|---|---|---|---|---|
| Usable life | ⊚ | ○ | ⊚ | ⊚ | ⊚ | ⊚ | ○ | ⊚ |
| Tensile shear test (N/mm²) | 4.2 | 3.9 | 4.0 | 3.0 | 4.8 | 4.4 | 4.3 | 6.0 |
| Failure mode | Cohesive failure | Thin-layer cohesive failure | Interfacial failure | Interfacial failure | Cohesive failure | Cohesive failure | Cohesive failure | Cohesive failure |
| Adhesive property | ⊚ | ⊚ | ○ | ○ | ⊚ | ⊚ | ⊚ | ⊚ |

| | Comparative Example 1 | Comparative Example 2 |
|---|---|---|
| (A) Polyoxyalkylene polymer A1 | 50 | 50 |
| (A) Polyoxyalkylene polymer A2 | 20 | 20 |
| (A) (Meth)acrylic-based polymer A3 | 30 | 30 |
| (B) Aminosilane-generating compound via light B1 | — | — |
| (B) Aminosilane-generating compound via light B2 | — | — |
| (B) Aminosilane-generating compound via light B3 | — | — |
| (B) Aminosilane-generating compound via light B4 | — | — |
| (D) Photobase generator Irgacur 379 50% PC solution *1 | 10 | 10 |
| (D) Photobase generator SA-2 20% PC solution *2 | — | — |
| (C) Fluorinated polymer C1 | 5 | 5 |
| (E) Boron trifluoride monoethylamine 10% PC solution | — | — |
| γ-aminopropyltriethoxysilane | — | 5.5 |
| Aluminum chelate compound *3 | — | — |
| Photo-radical generator *4 | 2.5 | 2.5 |
| (F) Epoxy group-containing silane KBM-403 *5 | — | — |
| TFT after UV irradiation | 4 min | 0 min |
| TFT without UV irradiation | 1 day or longer | 2.5 min |
| Usable life | ⊚ | X |
| Tensile shear test (N/mm²) | 2.1 | — |
| Failure mode | Interfacial failure | — |
| Adhesive property | X | — |

In Table 1, compounded amount of each of the blended materials is shown in grams. The polymers A1 to A3 are respectively the polymers A1 to A3 obtained in Synthesis Examples 2 to 4. The aminosilane-generating compound via light B1 to B4 are respectively the aminosilane-generating compound via light B1 to B4 obtained in Synthesis Examples 1 and 6 to 8. The fluorinated polymer C1 is the fluorinated polymer C1 obtained in Synthesis Example 5. Details of the other blended materials are described as follows.

*1) Photobase generator: trade name: Irgacur 379, manufactured by BASF Japan
*2) Photobase generator: trade name: SA-2, manufactured by San-Apro Ltd.
*3) Aluminum chelate compound: trade name: Aluminum Chelate D, aluminum monoacetylacetonate bis(ethylacetoacetate), manufactured by Kawaken Fine Chemicals Co., Ltd.
*4) Photo-radical generator: trade name: Darocur 1173, cleavage type photo-radical generator, manufactured by BASF Japan
*5) Epoxy group-containing silane: trade name: Shin-Etsu silicone KBM-403, 3-glycidoxypropyl trimethoxysilane, manufactured by Shin-Etsu Chemical Co., Ltd.

1) Tack-Free Time (TFT) Test

The photocurable composition was poured into a cylindrical container having a diameter of 20 mm and a height of 7 mm in a manner that the thickness of the photocurable composition was 7 mm. Without irradiation of UV or immediately after UV irradiation (irradiation conditions: metal halide lamp (irradiance: 330 mW/cm²); accumulated dose: 3000 mJ/cm²); the composition was placed in a dark room in an environment at 23° C. and RH 50%. The composition was touched by a finger every 30 seconds to measure the time until the surface of the composition becomes nonsticky (TFT). Furthermore, usable life was evaluated as follows: TFT without UV irradiation of 1 day or longer was "⊚", 2 hours or longer but shorter than 1 day was "○", and shorter than 2 hours was "×". The results are shown in Table 1.

2) Adhesive Property Test

The photocurable composition was coated on an adherend (aluminum (alumite sulfate-treated)) using a glass rod in a manner that the thickness of the photocurable composition was 100 μm, and then irradiated with UV (irradiation conditions: metal halide lamp (irradiance: 330 mW/cm²); accumulated dose: 3,000 mJ/cm²). Immediately after the irradiation, 25 mm×25 mm areas of the adherend (aluminum (alumite sulfate-treated)) were adhered to each other, pressed using a small bulldog clip, and cured at 23° C. and 50% RH for 1 day and for 7 days.

After the curing, measurement was performed at a test rate of 50 mm/min in accordance with JIS K6850, "Determination of tensile lap-shear strength of rigid-to-rigid bonded assemblies". Furthermore, the failure mode of the adhered surfaces was visually observed. Adhesive properties were evaluated based on the following criteria. The results are shown in Table 1.

⊚: Shear strength was 2.5 MPa or greater, and failure mode was cohesive failure or thin-layer cohesive failure
○: Shear strength was 2.5 MPa or greater
×: Shear strength was less than 2.5 MPa Working Examples 2 to 8 and Comparative Examples 1 and 2

Compositions were prepared in the same manner as in Working Example 1 except for changing the composition as shown in Table 1, and then measurements were performed. The results are shown in Table 1.

As shown in Table 1, the photocurable composition of the present invention exhibits excellent adhesive properties, and has sufficient usable life before irradiation of UV and excellent workability.

The invention claimrd is:

1. A photocurable composition having adhesive properties;
the composition comprising:
(A) a crosslinkable silicon group-containing organic polymer; and
(B) a crosslinkable silicon group-containing compound that forms, by light, at least one type of amino group selected from the group consisting of primary amino groups and secondary amino groups.

2. The photocurable composition according to claim 1, further comprising (C) a silicon compound having a Si—F bond.

3. The photocurable composition according to claim 1 or 2, further comprising (D) a photobase generator besides the crosslinkable silicon group-containing compound (B).

4. The photocurable composition according to any one of claims 1 or 2, wherein the crosslinkable silicon group-containing organic polymer (A) is at least one type selected from the group consisting of crosslinkable silicon group-containing polyoxyalkylene polymers and crosslinkable silicon group-containing (meth)acrylic-based polymers.

5. The photocurable composition according to any one of claims 1 or 2, further comprising (E) at least one type of fluorine-based compound selected from the group consisting of boron trifluoride, complexes of boron trifluoride, fluorinating agents, and alkali metal salts of polyvalent fluoro compounds.

6. The photocurable composition according to any one of claims 1 or 2, further comprising (F) an epoxy group-containing silane.

* * * * *